US012000140B2

(12) United States Patent
McGee et al.

(10) Patent No.: US 12,000,140 B2
(45) Date of Patent: Jun. 4, 2024

(54) ACOUSTIC DEVICE THERMOFORMING

(71) Applicant: The Regents of the University of Michigan, Ann Arbor, MI (US)

(72) Inventors: Jonathan Wesley McGee, Ann Arbor, MI (US); Cathlyn Newell, Detroit, MI (US); Zackery Belanger, Detroit, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 519 days.

(21) Appl. No.: 17/074,090

(22) Filed: Oct. 19, 2020

(65) Prior Publication Data

US 2021/0115664 A1    Apr. 22, 2021

Related U.S. Application Data

(60) Provisional application No. 62/923,229, filed on Oct. 18, 2019.

(51) Int. Cl.
| | | |
|---|---|---|
| *E04B 1/84* | (2006.01) | |
| *B26F 1/26* | (2006.01) | |
| *C03B 23/025* | (2006.01) | |
| *G10K 11/162* | (2006.01) | |

(52) U.S. Cl.
CPC ........ *E04B 1/8409* (2013.01); *C03B 23/0252* (2013.01); *G10K 11/162* (2013.01); *B26F 1/26* (2013.01); *E04B 2001/8414* (2013.01); *E04B 2001/8428* (2013.01)

(58) Field of Classification Search
CPC .......... E04B 1/8409; E04B 2001/8414; E04B 2001/8428; C03B 23/0252; G10K 11/162; B26F 1/26
See application file for complete search history.

(56) References Cited

U.S. PATENT DOCUMENTS

| | | | | | |
|---|---|---|---|---|---|
| 2,166,848 | A | * | 7/1939 | Prudden | E04B 1/8409 181/208 |
| 2,871,623 | A | * | 2/1959 | Marini | C03B 23/0258 65/23 |
| 3,279,043 | A | * | 10/1966 | Wirt | E04C 2/326 D5/1 |
| 4,226,299 | A | * | 10/1980 | Hansen | E04B 1/86 181/295 |
| 4,356,880 | A | * | 11/1982 | Downs | E04B 1/99 52/630 |
| 4,393,631 | A | * | 7/1983 | Krent | E04B 1/99 52/39 |
| 5,118,543 | A | * | 6/1992 | McColl | E06B 3/6715 428/167 |

(Continued)

OTHER PUBLICATIONS

Belanger et al., "Slumped Glass: Auxetics and Acoustics", Acadia 2018, pp. 244-249.

(Continued)

*Primary Examiner* — Forrest M Phillips
(74) *Attorney, Agent, or Firm* — Lempia Summerfield Katz LLC

(57) ABSTRACT

A method of fabricating an acoustic device includes forming a plurality of holes in a panel, disposing the panel in a support frame, and heating the panel to a temperature such that the panel sags while disposed in the support frame and each hole of the plurality of holes is modified.

39 Claims, 26 Drawing Sheets

(56) References Cited

U.S. PATENT DOCUMENTS

| | | | | |
|---|---|---|---|---|
| 5,923,002 | A * | 7/1999 | McGrath | E04B 1/82 |
| | | | | 181/290 |
| 6,125,965 | A * | 10/2000 | Wang | E04B 1/86 |
| | | | | 181/292 |
| 6,237,344 | B1 * | 5/2001 | Lee | F01D 25/12 |
| | | | | 60/754 |
| 11,479,965 | B1 * | 10/2022 | Johnson | E04B 9/241 |
| 2006/0042875 | A1 * | 3/2006 | Zainea | G10K 11/20 |
| | | | | 181/293 |
| 2014/0260281 | A1 * | 9/2014 | Innes | B23K 35/228 |
| | | | | 83/49 |
| 2018/0264774 | A1 * | 9/2018 | Bertoldi | B32B 3/266 |
| 2022/0340471 | A1 * | 10/2022 | Winstanley | C03B 23/02 |

OTHER PUBLICATIONS

Belanger, Zackery. 2012. "Sound Energy Evolution in Two-Dimensional Enclosures as Determined with a Finite Difference Time Domain Method." MA thesis, Rensselaer Polytechnic Institute.

Belanger, Zackery. 2016. "Toward the Circle." Retrieved from https://vimeo.com/168936852.

Konakovic, Mina, Keenan Crane, Bailin Deng, Sofien Bouaziz, Daniel Piker, and Mark Pauly. 2016. "Beyond Developable: Computational Design and Fabrication with Auxetic Materials." ACM Transactions on Graphics 35 (4):89.

Kowalczyk, Konrad. 2008. "Boundary and medium modelling using compact finite difference schemes in simulations of room acoustics for audio and architectural design applications." Ph.D. thesis, Queen's University, Belfast.

McGee et al., "Glass Cast: A Reconfigurable Tooling System for Free-Form Glass Manufacturing", Acadia 2012, Synthetic Digital Ecologies, 2012.

McGee et al., "Investigations in Free Form Glass Slumping", Acadia Posthuman Frontiers, 2016.

Neugebauer, Jurgen. 2014. "Applications for Curved Glass in Buildings." Journal of Facade Design and Engineering 2(1-2): 67-83.

Spectrum Glass. 2005. "Firing Guide: Basic Guide to Kiln Firing, System 96." 1-4. http://www.glsgmbh.de/pdf/herstellerprospekte/spectrum/firingguide.pdf.

* cited by examiner

ACOUSTIC DEVICE THERMOFORMING

CROSS-REFERENCE TO RELATED APPLICATION

This application claims the benefit of U.S. provisional application entitled "Acoustic Device Thermoforming," filed Oct. 18, 2019, and assigned Ser. No. 62/923,229, the entire disclosure of which is hereby expressly incorporated by reference.

BACKGROUND OF THE DISCLOSURE

Field of the Disclosure

The disclosure generally relates to acoustic devices and systems.

Brief Description of Related Technology

Building interiors are predominately flat and orthogonal. These attributes preserve sonic content in the form of sustained reverberation and repetitive sound propagation paths. Such spaces are thus often acoustically harsh, and poor for concentration and communication.

As an architectural material, glass offers unique attributes of crisp visual transparency, durability, strength, and malleability at a wide range of scales. Glass has often been bent via molds. Glass sheets mounted on molds are conveyed through a lehr having zones of progressively increasing temperature. Eventually the glass sheet is allowed to settle freely onto the surface of the mold. When the mold surface includes portions of sharp curvature, local zones of concentrated heat have been used to create rapid softening of the corresponding areas of the glass. Such localized heating have been provided via placement of gas burners or electrical heating elements. Reflectors and heat shields have also been used in efforts to selectively apply heat. Nevertheless, these techniques unfortunately result in undesired heating of other portions.

Use of molds is also often prohibitively expensive. For instance, molds capable of withstanding the elevated temperatures of glass forming are expensive and time consuming to produce. Moreover, any system having variation in component shapes involves the creation of a separate mold for each respective shape. The creation of each separate mold accordingly increases the cost of fabrication.

SUMMARY OF THE DISCLOSURE

In accordance with one aspect of the disclosure, a method of fabricating an acoustic device includes forming a plurality of holes in a panel, disposing the panel in a support frame, and heating the panel to a temperature such that the panel sags while disposed in the support frame and each hole of the plurality of holes is modified.

In accordance with another aspect of the disclosure, a method of fabricating an acoustic pane includes cutting a plurality of elongated slots in a flat panel, supporting the flat panel with a frame, and disposing the flat panel in a kiln to heat the flat panel to a temperature such that the flat panel sags while disposed in the support frame and each hole of the plurality of holes undergoes deformation.

In accordance with yet another aspect of the disclosure, an acoustic device includes a panel having a perimeter and an interior face within the perimeter, the interior face having a curvature, and a plurality of holes in the interior face. The interior face is twisted beyond the curvature at one or more holes of the plurality of holes.

In accordance with still another aspect of the disclosure, an acoustic system includes a framework and a plurality of panes supported by the framework. Each pane includes a face with a curvature and further includes a plurality of holes in the face, and the curvature, the plurality of holes, or both the curvature and the plurality of holes differ across the plurality of panes.

In connection with any one of the aforementioned aspects, the methods, devices, and/or systems described herein may alternatively or additionally include or involve any combination of one or more of the following aspects or features. Forming the plurality of holes includes cutting a plurality of elongated slots in the panel. The plurality of holes include at least one hole shaped such that the at least one hole exhibits auxetic deformation when the panel sags. Forming the plurality of holes includes implementing a waterjet cutting procedure. The plurality of holes are arranged in a pattern. The plurality of holes include a first hole and a second hole, and the first and second holes have different shapes. The plurality of holes are arranged asymmetrically across the panel. A spacing between adjacent holes of the plurality of holes varies across the panel. Hole size for the plurality of holes varies across the panel. The panel includes a glass material. The glass material includes float glass. The method further includes defining a perimeter shape of the flat panel before disposing the panel in the support frame. The method further includes supporting the panel with a plurality of rods as the flat panel is initially heated. The curvature is non-uniform. Each hole of the one or more holes is configured such that the interior face includes a flap at each hole, each flap projecting outward from the curvature of the interior face. The panel has an inflection between the perimeter and the curvature of the interior face. The perimeter is disposed in a plane, and the curvature projects outward from the plane. The plurality of holes are arranged in a pattern. The pattern is radially asymmetrical. Each hole of the plurality of holes is elongated. The plurality of holes include a first hole and a second hole, and the first hole is oriented at an angle relative to the second hole. A spacing between adjacent holes of the plurality of holes varies across the interior face. The plurality of holes include a first hole and a second hole, and the first and second holes have different shapes. Hole size for the plurality of holes varies across the interior face. The panel includes a glass material. The glass material includes float glass. An acoustic system includes a framework, and a plurality of panes supported by the framework, each pane of the plurality of panes being configured as described herein. In at least one pane of the plurality of panes, the face is twisted beyond the curvature at one or more holes of the plurality of holes. The plurality of panes are disposed in multiple layers. The plurality of panes includes first and second panes arranged back-to-back. The framework is configured to suspend the plurality of panes from a set of wires. The framework includes a flat surface to which the plurality of panes are mounted. The framework is configured such that the plurality of panes are disposed in a standalone arrangement.

BRIEF DESCRIPTION OF THE DRAWING FIGURES

Figure 1:
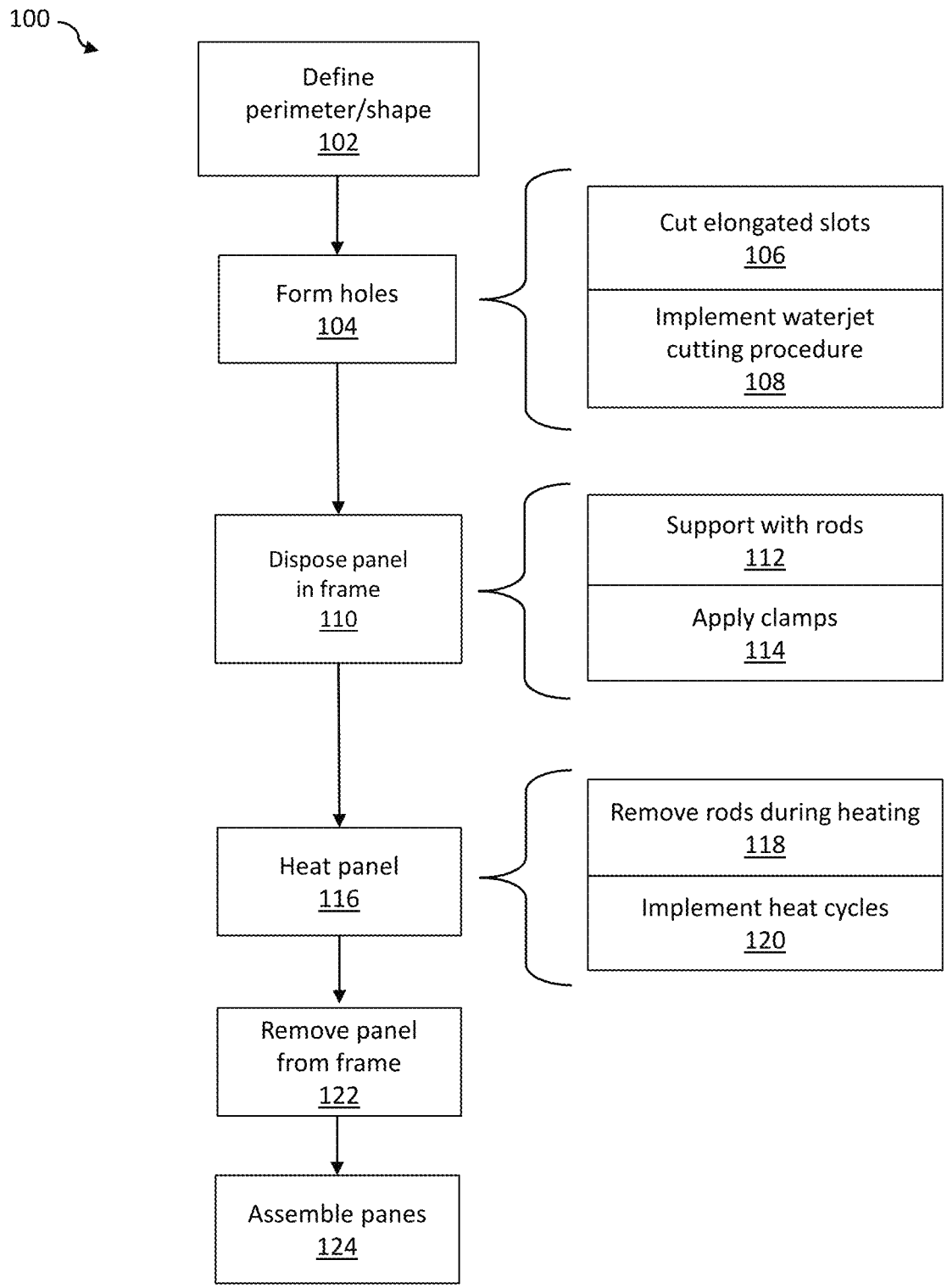
FIG. 1 is a flow diagram of a method of fabricating an acoustic device in accordance with one example.

The embodiments of the disclosed systems and methods may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION OF THE DISCLOSURE

The disclosure relates to thermoformed acoustic devices and systems. The disclosed devices and systems may be used to implement a wide variety of surface shaping solutions to manipulate sonic character. The solutions may accordingly be directed to achieving desired interior acoustic performance, including, for instance, performance that balances comfort and function. Methods of fabricating the acoustic devices are also described. The acoustic devices are configured as curved panels. The panels are fabricated via thermoforming techniques that do not rely on molds to achieve desired curvature(s). The thermoforming techniques instead involve controllably allowing the panels to slump or sag. The deformation from such sagging or slumping may result in a variety of curvatures. Control of the deformation is provided via a plurality of cuts in the panel, as well as other parameters, such as temperature, perimeter shape, and panel thickness. As described below, the cuts may be configured to provide auxetic features in the acoustic device. The cuts may be arranged in various patterns to achieve different curvatures and, thus, acoustic effects. The disclosed acoustic systems include various arrangements of the acoustic devices.

The disclosed devices and systems may use the selective removal of material from the panels to achieve various acoustic effects, e.g., reflection, diffusion, filtering, focusing, dissipation, transparency, etc., and combinations thereof. For instance, the amount of curvature may be determinative of an extent of diffusive behavior. The disclosed fabrication methods allow a wide variety of shapes and, thus, acoustic effects, to be achieved. The aggregation of similar or differing devices into various arrangements provides additional acoustic configurability.

The disclosed methods, devices, and systems may use glass plates or sheets. Plate glass, which has controllable and uniform acoustic behavior, may be formed into curved surfaces through a combination of parametrically-driven auxetic pattern generation, CNC water-jet cutting, and controlled heat forming. The plate glass may be curved to achieve complex acoustic behavior. The cut pattern allows the curvature to be altered and controlled across the pane of glass. Additional or alternative parameters of the thermoforming procedure may be used to control the curvature, as described below.

The disclosed acoustic devices and systems may be used in a wide variety of applications. For instance, the devices and systems may be mounted on walls, suspended (e.g., from a set of wires) and/or attached to a ceiling (or other mounting surface), or otherwise disposed to absorb, dissipate, or otherwise affect noise and/or other sound. Alternatively, the devices and systems may be disposed in a standalone configuration (e.g., a free-standing arrangement). In some cases, the devices and systems may be configured and used to correct or otherwise address the acoustics of a room or other space. For instance, various types of echo or resonance effects may be augmented or diminished.

The disclosed methods are directed to fabricating an acoustic pane or other device with both curvature and perforation or other holes or openings. Both of these aspects have useful acoustic effects. Curved glass may be used to achieve a distinct diffusion effect. The perforations may be used to allow passage of sound (e.g., past the pane) to an absorber or to achieve a Helmholtz or trapping effect. The ability to control the shape of the curved acoustic device without the use of a mold is also useful.

FIG. 1 depicts a method 100 of fabricating an acoustic device, such as a pane. The method 100 may include an act 102 in which a flat panel is cut to define a perimeter or shape of the flat panel. The perimeter of the flat panel may be cut to accommodate (e.g., match) the shape of a support frame (described below) and/or achieve a desired shape suitable for an application. The shape may thus vary to accommodate an arrangement of acoustic devices and/or the shape of the wall or other surface on which the acoustic devices are deployed or otherwise arranged. Alternatively or additionally, the shape may vary to create or establish a partition, ceiling, wall, or other surface or structure. A wide variety of shapes may be used, including, for instance, rectilinear shapes such as a square, hexagon, or triangle, and non-rectilinear shapes.

The panel may or may not be flat or planar at this point. In some cases, the panel may be curved to any desired extent. Such curvature may, for instance, be an artifact of the panel formation procedure.

In some cases, the flat panel may be composed of, or otherwise include, a glass material. For example, the glass material may be or include plate glass, but any glass material may be used. Use of glass may be useful for multiple reasons, including, for instance, the flame resistance of glass. Nonetheless, alternative or additional materials may be used, including, for instance, plastic materials. The panel may be composed of, or otherwise include, yet further material or materials.

The method 100 includes an act 104 in which a number of holes are formed in the panel. In some cases, forming the holes includes an act 106 in which a number of slots are cut into the panel. Some or all of the holes may thus be configured as slits or slots, or are otherwise elongated. Alternatively or additionally, some or all of the holes are non-straight. For example, the holes may be V-shaped. The shape of the holes may otherwise vary, e.g., across the surface of the panel, or between panels. The number, spacing, relative orientation, width, and/or other characteristics of the holes may also vary.

The holes may be formed in the panel using various material removal techniques, including mechanical, chemical, irradiation, and other procedures. In some cases, the act 104 includes implementation of a waterjet cutting procedure in an act 108. The resulting holes in the float glass may thus be the width of the kerf of the waterjet. In some cases, the kerf of the water jet is such that the holes have a width that falls in a range from about 0.034 inches to about 0.044 inches. In other cases, holes of other widths may be formed, e.g., with a waterjet having a kerf that falls in a range from about 0.01 inches to about 0.1 inches. The waterjet cutting procedure may be a computer numerical controlled (CNC) procedure. Alternative or additional procedures may be used. For instance, the material removal may include various types of cutting procedures, such as laser ablation.

The plurality of holes may be distributed or positioned across the panel in accordance with a pattern. The pattern may be symmetrical or asymmetrical. A number of example patterns are shown and described herein.

The method includes an act 110 in which the panel is loaded or otherwise disposed into a support frame. The support frame is configured to support the panel during heating. For instance, the support frame may be sized and include components suitable for disposition within a kiln or other heating apparatus. Further details regarding examples of support frames are described and shown herein.

The support frame may be configured to allow the panel to slump or sag during the heating process. For instance, the support frame may be configured to engage the panel at one or more points along the perimeter of the panel. One or more characteristics of the panel may be accordingly configured to engage the support frame, as described herein. The perimeter of the panel may thus be held stationary while an interior of the panel deforms under its own weight.

In some cases, the act 110 includes an act 112, in which the flat panel is supported with a plurality of rods. The rods provide initial or temporary support of the interior of the panel. For instance, the rods may be used as the flat panel is initially heated. Such temporary support helps to prevent the glass from breaking before it reaches full slump temperature. The rods are then removed at a suitable time in the heating sequence. The rods may be positioned across the lateral extent of the panel.

Other components may be used to support the panel during implementation of the method 100. For example, the support frame may include or otherwise support the use of a number of clamps. The act 110 may thus include an act 114, in which the clamps are applied to the perimeter of the panel to secure the panel to the support frame.

The method 100 includes an act 116 in which the panel is heated. The panel may be disposed in a kiln or other apparatus. The heating raises the panel to a temperature such that the panel deforms while disposed in the support frame. The deformation includes slumping or sagging of the panel. The holes in the panel may be used to control the extent of the slump or sag. For instance, the panel may sag more in areas in which the density of holes is greater.

The thermal deformation may also include or involve the modification of one or more of the holes in the panel. In some cases, the modification may include auxetic deformation. For example, the panel (e.g., a portion of the panel) may twist or otherwise deform in addition to the general curvature of the slump or sagging. In some cases, the auxetic behavior includes the modification of the shape of the holes. For instance, a slot may become diamond shaped. Alternatively or additionally, some or all of the deformation may be non-auxetic.

In some cases, the act 116 includes removal of the support rods in an act 118. The rods may be removed after the temperature of the kiln reaches a level at which the panel is no longer at risk of thermal shock. The removal temperature may vary with various other parameters, including, for instance, the thickness and/or composition of the panel.

The kiln may implement a heating sequence in an act 120. The sequence may include a number of cycles or other stages, examples of which are described below. Each stage may be defined by a number of parameters, including an initial temperature, a final temperature, a temperature gradient, and a time period. The sequence may vary from merely ramping up from an initial temperature (e.g., room temperature) and back down. For instance, the sequence may include one or more stages in which the temperature is lowered for a period of time.

The support frame may be tightened at a temperature of 1076 F/580 C. The support rods may be removed, allowing the glass to sag freely. Glass may be permitted to sag from 0"-10" of depth. Various heating cycles may be implemented. The depth of the curvature may be controlled by the duration of time of the kiln heating cycle. One or more slumps may be formed on the flat panel to create a curved panel. The extent of the deformation of the curved panel depends on the configuration of the geometric shapes, the thickness of sheet panel, the perimeter of the sheet panel, the placement of the heat, and the time the heat is applied. Once the heating cycle is complete, the glass is removed. In an embodiment, the glass panel is assembled on wires held in tension using hardware attachments.

The method 100 may include an act 122 in which the panel is removed from the support frame. In some cases, the panel may then be aggregated with other panels for assembly into an acoustic system in an act 124. The assembly may include installation of the panels into a support framework, examples of which are described below.

The method 100 may include fewer, additional, or alternative acts. For instance, the panels may be pre-cut into a desired shape.

The order in which the acts of the method 100 are implemented may vary from the example shown in FIG. 1. For instance, the holes may be formed before the panels are cut into a desired shape.

Figure 2:
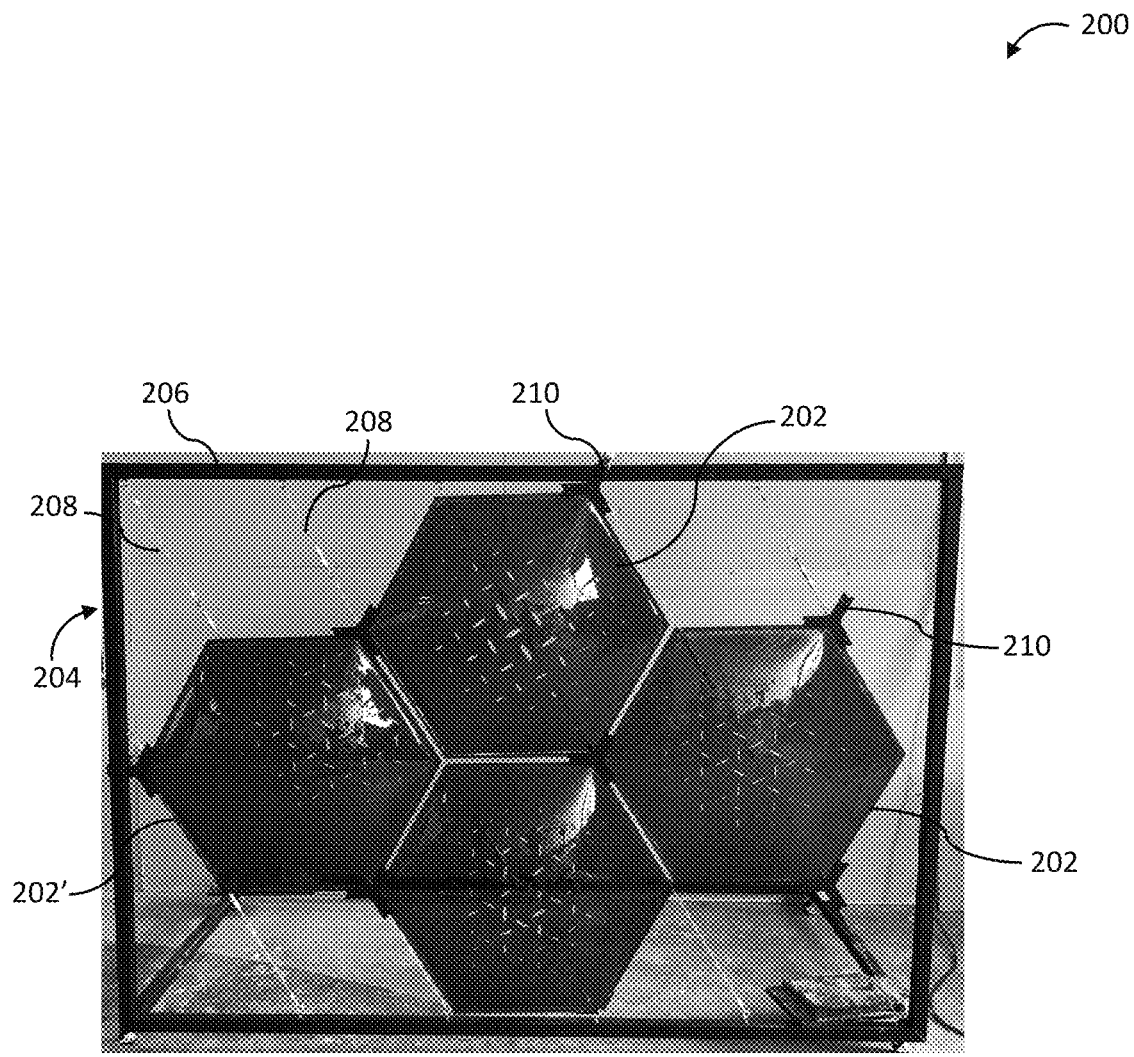
FIG. 2 is an elevational view of an acoustic system that includes a plurality of acoustic devices in accordance with one example.

FIG. 2 depicts an acoustic system 200 that includes an arrangement of acoustic panes 202. Each acoustic pane 202 may be or include an acoustic device fabricated in accordance with the method 100 of FIG. 1. The acoustic panes 202 may be arranged and otherwise configured so that the acoustic system 200 achieves a desired acoustic effect and/or performs a desired acoustic function. For instance, the panes 202 may be configured such that the acoustic system 200 provides a diffusive effect or acts as a sound absorber or a resonator. Alternative or additional effects or functions may be provided.

Fewer, additional, or alternative panes 202 may be included in the acoustic system 200. For instance, the number of panes 202 may be limited for purposes of ease in illustration or description. In some cases, the acoustic system 200 may instead include a number of panes sufficient to cover most, if not all, of a wall of a room.

Each acoustic pane 202 of the acoustic system 200 may or may not be similarly configured. In the example of FIG. 2, each acoustic pane 202 has a hexagonal shape. However, the pattern or distribution of holes may in each acoustic pane 202 may differ. For instance, the pane 202' has a non-uniform or asymmetrical hole distribution that differs from the other acoustic panes 202. In this case, the hole distribution of the pane 202' is skewed toward one side. In contrast, the other acoustic panes 202 may have a symmetrical and centered distribution of holes. The panes of the acoustic system 200 may vary relative to one another in one or more other ways, including, for instance, shape, surface area, thickness, and material composition.

The acoustic system includes a framework 204 to support the acoustic panes 202. In this example, the framework 204 includes an outer frame 206 and a set of wires 208 secured to, and extending between, sides of the outer frame 206. The acoustic panes 202 are disposed and mounted within the framework 204 using the wires 208 as guides. In some cases, the wires 208 are held in tension. The wires 208 may thus take the weight of each pane 202 so that each pane 202 is suspended and not bearing the weight of any neighboring panes 202. In this example, the wires 208 are secured to the acoustic panes 202 using attachment clips 210. The manner in which the acoustic panes 202 are assembled into the framework 204 may vary. For instance, alternative or additional types of attachment hardware may be used, such as various types of snaps or hooks.

Each acoustic pane 202 has a perimeter and an interior face within the perimeter. In this example, the perimeter is configured such that each acoustic pane 202 has a hexagonal shape. The hexagonal shape may be useful for minimizing space between adjacent acoustic panes 202. Alternative or additional shapes may be used. For instance, the system 200 may include one or more acoustic panes shaped to fill a non-hexagonal space adjacent to the outer frame 206.

The interior face of each acoustic pane 202 is curved. The curvature may be the result of the above-described thermoforming procedure. In this example, each acoustic pane 202 is oriented to present a convex curvature. The convex curvature may be useful for providing, e.g., a diffusive acoustic effect. Concave or other (e.g., more complex) curvatures may alternatively or additionally be included. The curvature may vary within each acoustic pane 202 and/or between different acoustic panes 202. For instance, the curvature may vary such that the interior face is flat, minimally slumped, moderately slumped, and/or deeply slumped. The amount of curvature may be tailored to achieve a desired amount of diffusion and/or any other acoustic effect or function. The curvature (depth) and other dimensions of the acoustic panes 202 may be selected such that the acoustic panes 202 exhibit dimensions of at least one-quarter of the largest wavelength (lowest frequency) to be diffused. The aggregation of the acoustic panels 202 into the acoustic system 200 provides for additional diffusion.

The interior face of each acoustic pane 202 has a plurality of holes. In this example, each hole is elongated. The orientation of the holes 202 may vary. In this case, the holes of one of the acoustic panes 202 are oriented orthogonally to one another. The holes of the other acoustic panes 202 are oriented at other angles.

The lateral distribution of the holes in each acoustic pane 202 may also vary. In this example, the holes are not located near the perimeter of the acoustic pane 202. For instance, the holes are spaced from the perimeter more than the spacing between adjacent holes.

The acoustic panes 202 in the example of FIG. 2 may have non-auxetic features or surfaces. In other cases, one or more of the acoustic panes 202 instead has an interior face twisted beyond the curvature of the acoustic pane 202. Such twisting may be located at one or more of the holes. Other types of auxetic features may be included, as described below.

Figure 24:
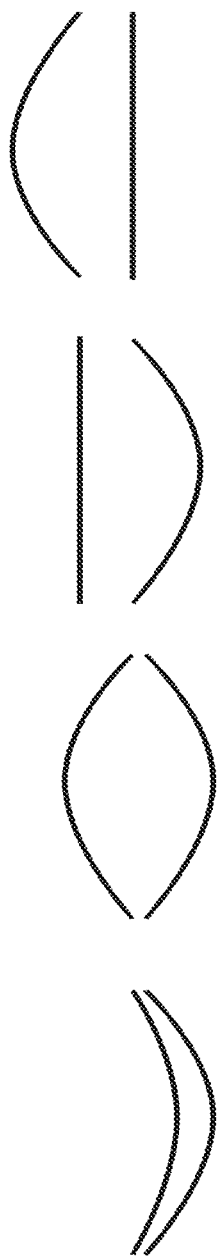
FIG. 24 depicts schematic, side views of multiple layer arrangements of acoustic panes in accordance with several examples.

In the example of FIG. 2, the acoustic system 100 includes a single layer of acoustic panes. In other cases, the arrangement may include multiple layers. For instance, the arrangement may include multiple (e.g., two) layers with acoustic panes disposed in a front-to-back, back-to-back, or other arrangement. Various examples of two-layer arrangements are shown in FIG. 24. The panes in the multiple layers may or may not be aligned as shown in the examples of FIG. 24. Thus, the panes in adjacent layers may be offset from one another. In some cases, the holes in the pane of one layer may be aligned with the holes in the adjacent layer. In other cases, the holes in the panes of the adjacent layers are not aligned. In still other cases, one of panes has holes, while the other pane does not have holes. The spacing or volume between adjacent layers may be varied or otherwise selected to tailor or achieve a desired acoustic effect. The number of layers in multiple layer arrangements may exceed two layers in other cases.

Figure 3:
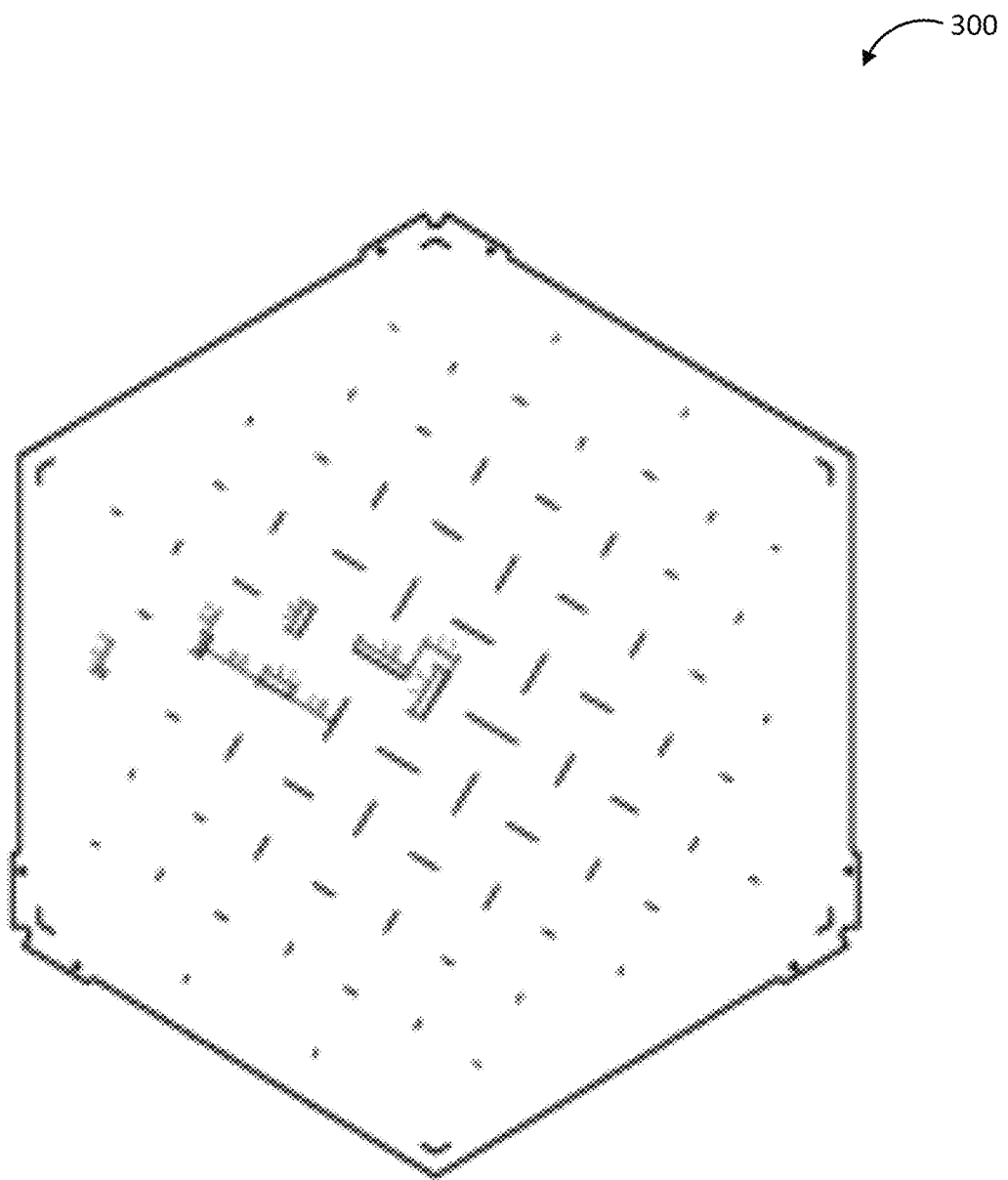
FIG. 3 is a schematic view of a flat panel having a cut pattern prior to thermoforming in accordance with one example.

FIG. 3 depicts a panel having a cut pattern in accordance with one example. In this case, the panel is flat. The panel may be processed in accordance with the method 100 of FIG. 1, or another method, to form one of the acoustic panes 202 of the acoustic system 200 of FIG. 2, or another acoustic device or system.

The flat panel is composed of a material capable of deformation when the material is exposed to heat. For example, the flat panel may be composed of, or otherwise include, a glass or plastic material. In some cases, the glass material may be or include float glass (e.g., 4 mm float glass). Float glass may be useful because it has uniform thickness and may produce sheets with flat surfaces. Float glass has a high structural flexibility and is capable of being easily shaped and bent into a variety of forms while it is in a heated state. The flat panel may be pre-cut to specific geometrical shapes, as described above.

The panel includes a plurality of elongated holes arranged in a pattern. In this example, the pattern includes holes oriented in one of two directions. The directions are orthogonal to one another. The holes alternate between the two orientations. In this case, the size (e.g., length) of the holes varies, with the longest holes at or near the center of the panel, and the shortest holes being closest to the perimeter of the panel. Such variance in hole size, and corresponding hole-to-hole spacing, may be useful for varying the extent of the slump or sag during thermoforming. In this case, the panel sags the most in the center and the least near the perimeter. Other hole patterns, sizes, orientations, and distributions may be used. The holes may vary in additional or alternative ways. For instance, the width or shape of the holes may vary.

The patterning may be used to determine whether the panel exhibits auxetic behavior during slumping. Some patterns lead to panels slumping in accordance with a positive Poisson's ratio. In such cases, the panel deforms in the direction in which the panel is stretched. Other patterns lead to panels exhibiting auxetic behavior, or a negative Poisson's ratio, in which deformation occurs in directions other than the stretching force. The panel may thus include features that twist out of the general curvature of the slump.

Figure 4:
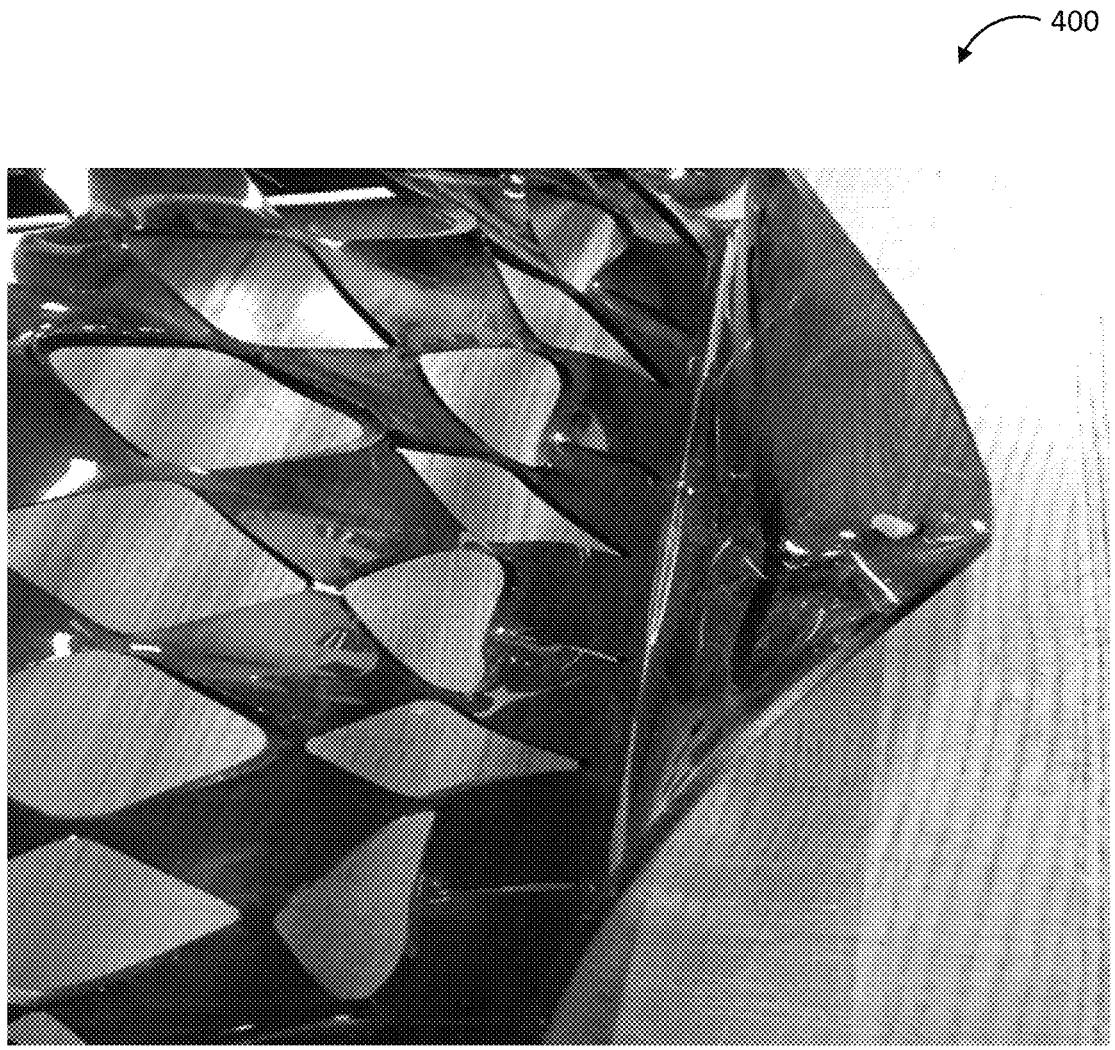
FIG. 4 is a perspective view of an acoustic device having auxetic features as a result of thermoforming in accordance with one example.

FIG. 4 depicts an example of a panel having a cut pattern that leads to auxetic deformation. The cuts in the panel are configured such that the surface twists or spins during slumping. The interior face is thus twisted beyond the curvature at one or more of the holes. The cuts are also configured such that the size of the opening increases as the panel slumps. The spacing and length of the cuts may be selected to support such deformation.

Figure 5:
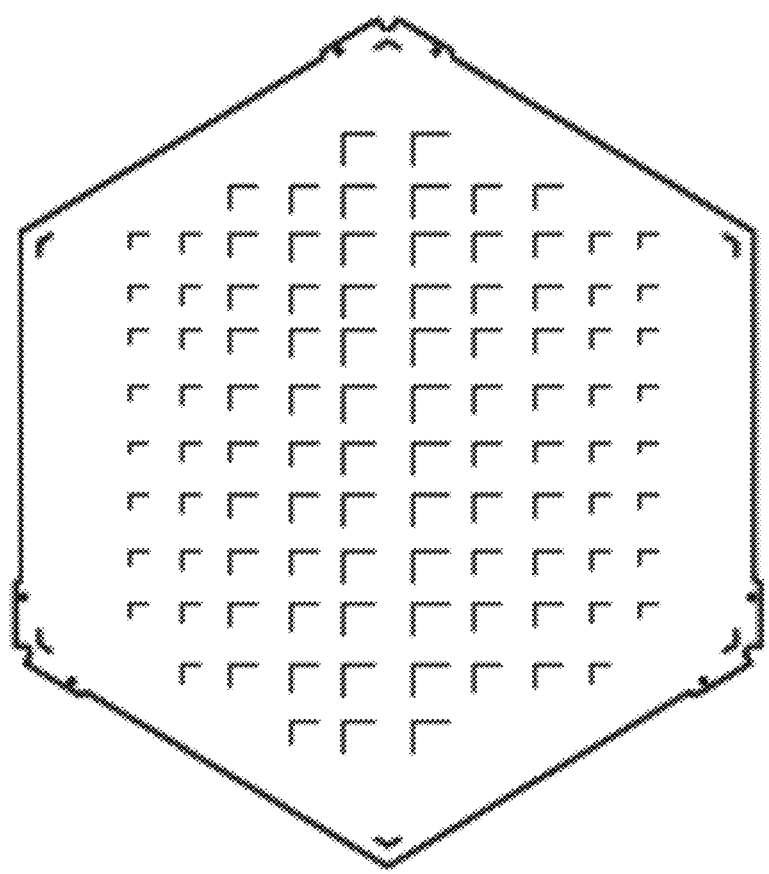
FIG. 5 is a schematic view of a flat panel having a cut pattern prior to thermoforming in accordance with one example.

FIG. 5 depicts a panel having a cut pattern in accordance with another example. The panel may be processed in accordance with the method 100 of FIG. 1, or another method, to form one of the acoustic panes 202 of the acoustic system 200 of FIG. 2, or another acoustic device or system. The panel may have a composition and other characteristics similar to the examples described above. For instance, the panel also includes a plurality of holes arranged in a pattern. As in other examples, the pattern is an array with the holes arranged in a number rows and columns. In this example, however, the holes are not elongated cuts. The holes are instead non-straight. In this case, each hole includes a V-shaped cut.

The size of the cuts varies across the surface of the panel. In this example, larger cuts are located in the columns located along a center axis. The cuts in other columns become smaller as the lateral distance from the center axis increases.

When the panel is heating to slumping temperatures, the V-shaped cuts may or may not exhibit auxetic behavior depending on various parameters, including, for instance, the length of the cuts, the spacing of the cuts, and the temperature sequence. The V-shaped cuts may be used to create directional flaps. Other cuts may alternatively or additionally be used to create directional flaps.

Figure 6:
FIG. 6 is a schematic view of an acoustic device as a result of thermoforming in accordance with one example.

FIG. 6 depicts an example of a panel having V-shaped cuts after heating to a slumping temperature. In this case, the slumping results in non-auxetic expansion of the V-shaped cuts. In other cases, the cuts may exhibit auxetic behavior. For instance, the panel may develop flaps at each cut that sag beyond the curvature of the panel.

Figure 7:
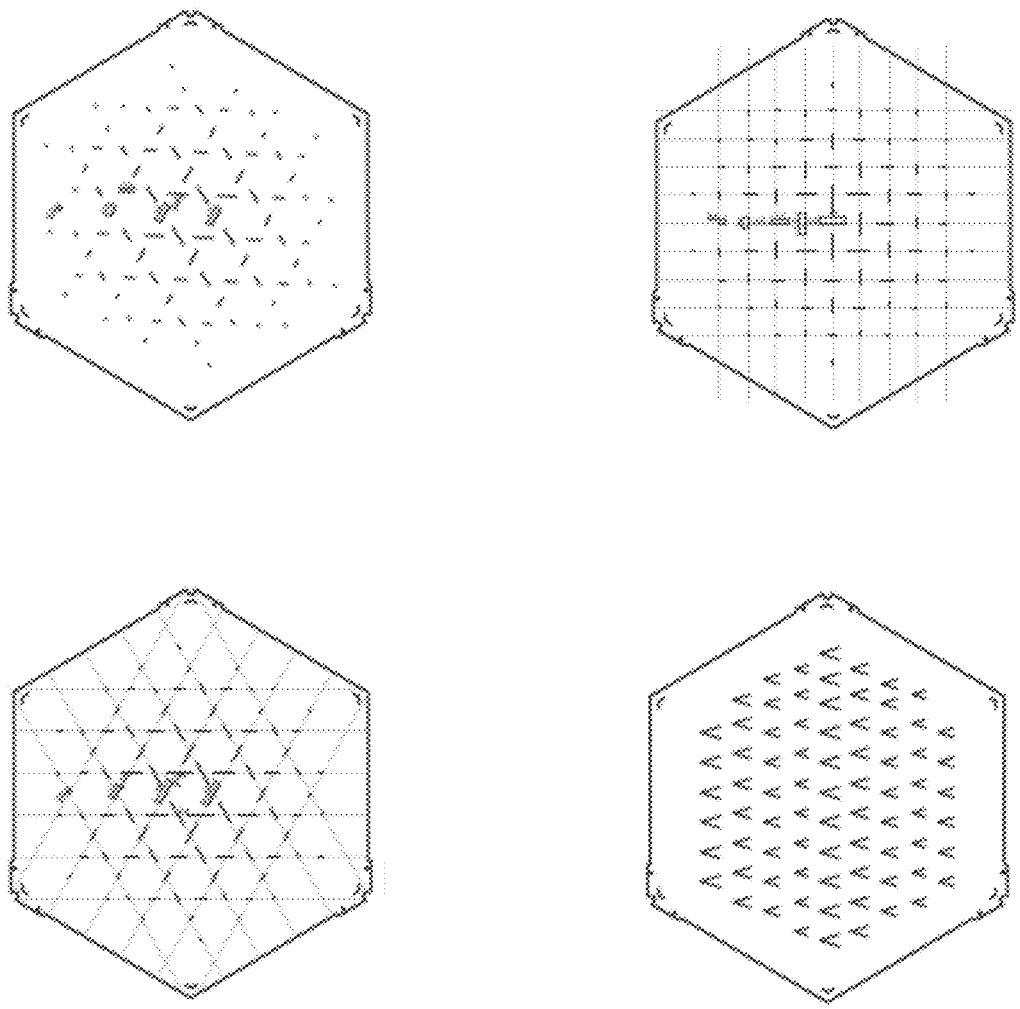
FIG. 7 depicts schematic views of a number of flat panels having various cut patterns in accordance with several examples.

FIG. 7 depicts several examples of panels with other cut patterns. The examples depict how the orientation, length (or other size), directionality, and spacing of the cuts may vary. The examples also depict how the cuts may vary across the surface of a panel. Still other cut patterns may be used. For instance, a panel may have a combination of non-straight (e.g., V-shaped) and straight cuts.

Figure 8:
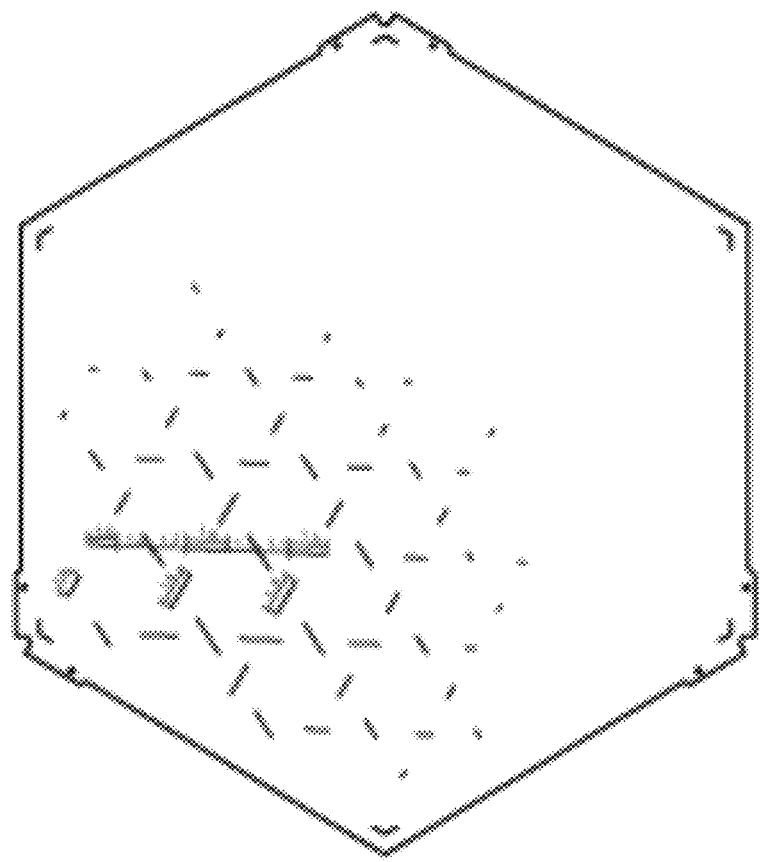
FIG. 8 is a schematic view of a flat panel having an asymmetrical cut pattern that varies across a surface of the flat panel in accordance with one example.

FIG. 8 depicts an example of a panel with holes in a radially asymmetric arrangement. In this example, the holes are biased toward one side of the hexagonal shape of the panel. The asymmetry may be useful for controlling the magnitude or extent of certain acoustic effects. For instance, the holes may be used to increase absorption for sound that would otherwise be reflected in one direction, while the absence of holes may be used to allow a relatively greater amount of sound to be reflected in another direction.

Figure 9:
FIG. 9 depicts perspective views of a number of acoustic devices having various cut patterns in accordance with several examples.
Figure 9:
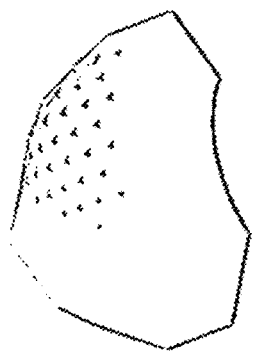
Figure 9:
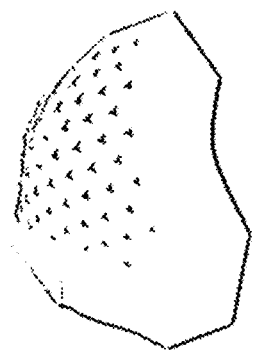
Figure 9:
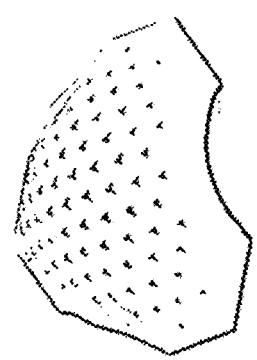

FIG. 9 depicts a set of acoustic devices that may be aggregated in a system to achieve a desired acoustic effect. In this example, the acoustic devices have different hole patterns. The hole patterns vary in the extent of distribution across the surface of the pane. The acoustic devices may be arranged along a wall or other surface to control the amount of absorption and reflection at various positions. For example, the acoustic devices with a greater, symmetrical distribution of holes may be disposed in the center of the wall (for relatively higher absorption in the center), while other acoustic devices with decreasing hole distributions are used as the distance from the center of the wall increases. Other arrangements may be used. For instance, the acoustic devices may be arranged in the opposite manner, i.e., with acoustic devices having more holes away from the center of the wall.

Figure 10:
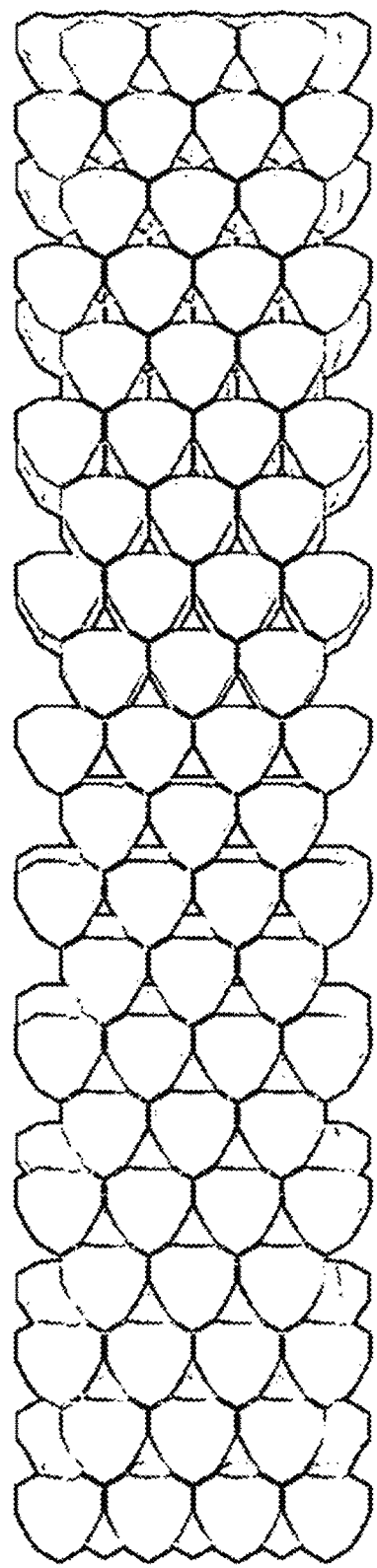
FIG. 10 is an elevational view of an acoustic system having an arrangement of panes in accordance with one example.
Figure 23:
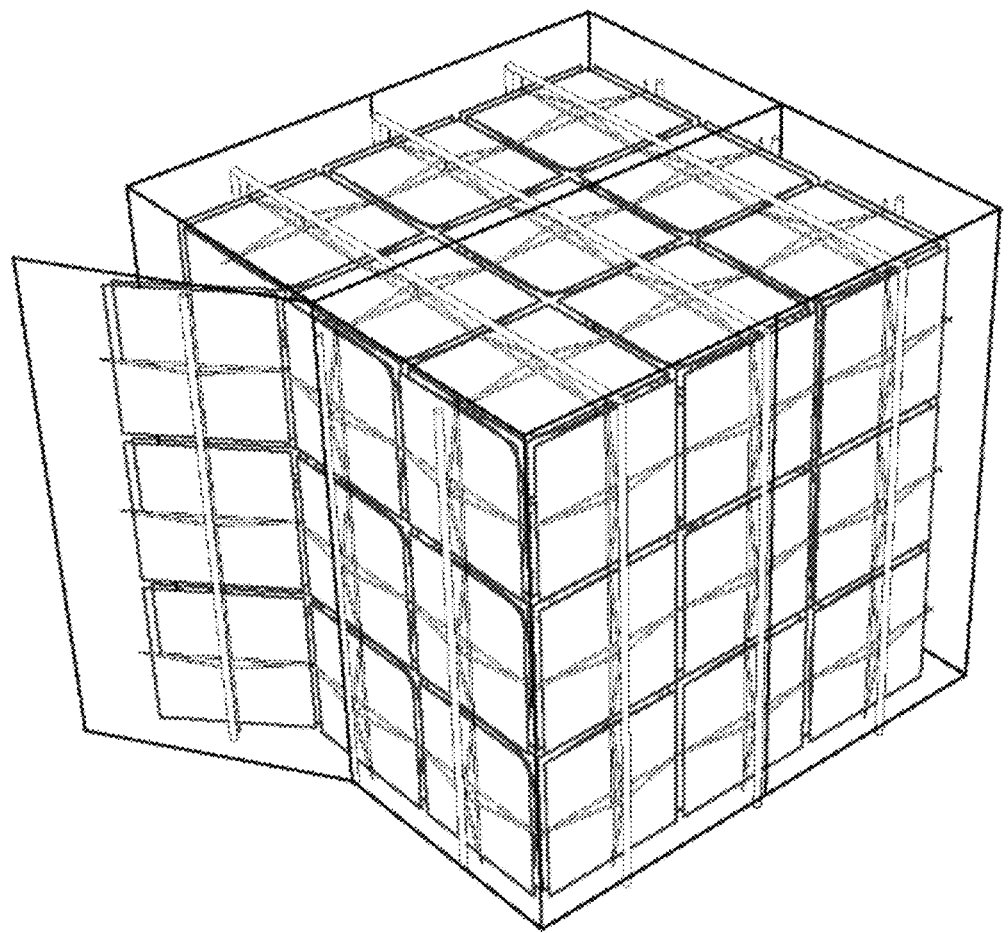
FIG. 23 is a perspective view of an acoustic system having a number of panes arranged across multiple surfaces in accordance with one example.

FIG. 10 depicts an acoustic system having multiple layers of panes. In some cases, the acoustic system is mounted on a wall. Other types of backers, substrates, or mounting surfaces may be used, including, for instance, a sheet of flat glass (e.g., a sheet without holes), an example of which is shown in FIG. 23. In still other cases, the acoustic system is free standing (e.g., in a standalone configuration), or suspended from ceiling or other object. In this example, the acoustic system includes two layers of panes. The panes of the two layers may be oriented back to back, such that the panes in the front layer are convex relative to the incident sound, and the panes in the rear layer are concave. Other orientations may be used. The panes of the two layers may be laterally offset from one another as shown. The degree of overlap may vary across the acoustic system, such that panes near the lateral edges may be less offset, if at all. The panes may be aligned or offset to any desired extent.

In some cases, a two or other multiple layer system may be used to create an enclosure volume. The panels of the multiple layers may be aligned in such cases. One or more interfaces may be sealed to facilitate enclosure. Such systems may be useful in providing, for instance, Helmholtz absorption.

Each pane may be configured in accordance with any one of the examples of acoustic devices described herein, or another acoustic device. In this example, each pane has an asymmetrical perimeter shape. Each pane may have any hole pattern. The holes are not depicted in FIG. 10 for ease in illustration.

The acoustic function of the acoustic system may vary in accordance with the positioning and offset of the panes of the two layers, as well as the hole distributions within each pane. By changing these parameters, the acoustic system (or a respective portion thereof) may perform as a focuser, reflector, diffuser, dissipator, or even as an absorber. The acoustic functionality of the acoustic system may be frequency dependent.

The acoustic function of the system (or system portion) may be established by a grouping of panes. In some cases, the acoustic system may include multiple groupings. Thus, the configuration and arrangement of the panes may establish different functions for respective sections, zones or other portions of the acoustic system. The panes in each portion may collectively establish the function of the portion.

Figure 11:
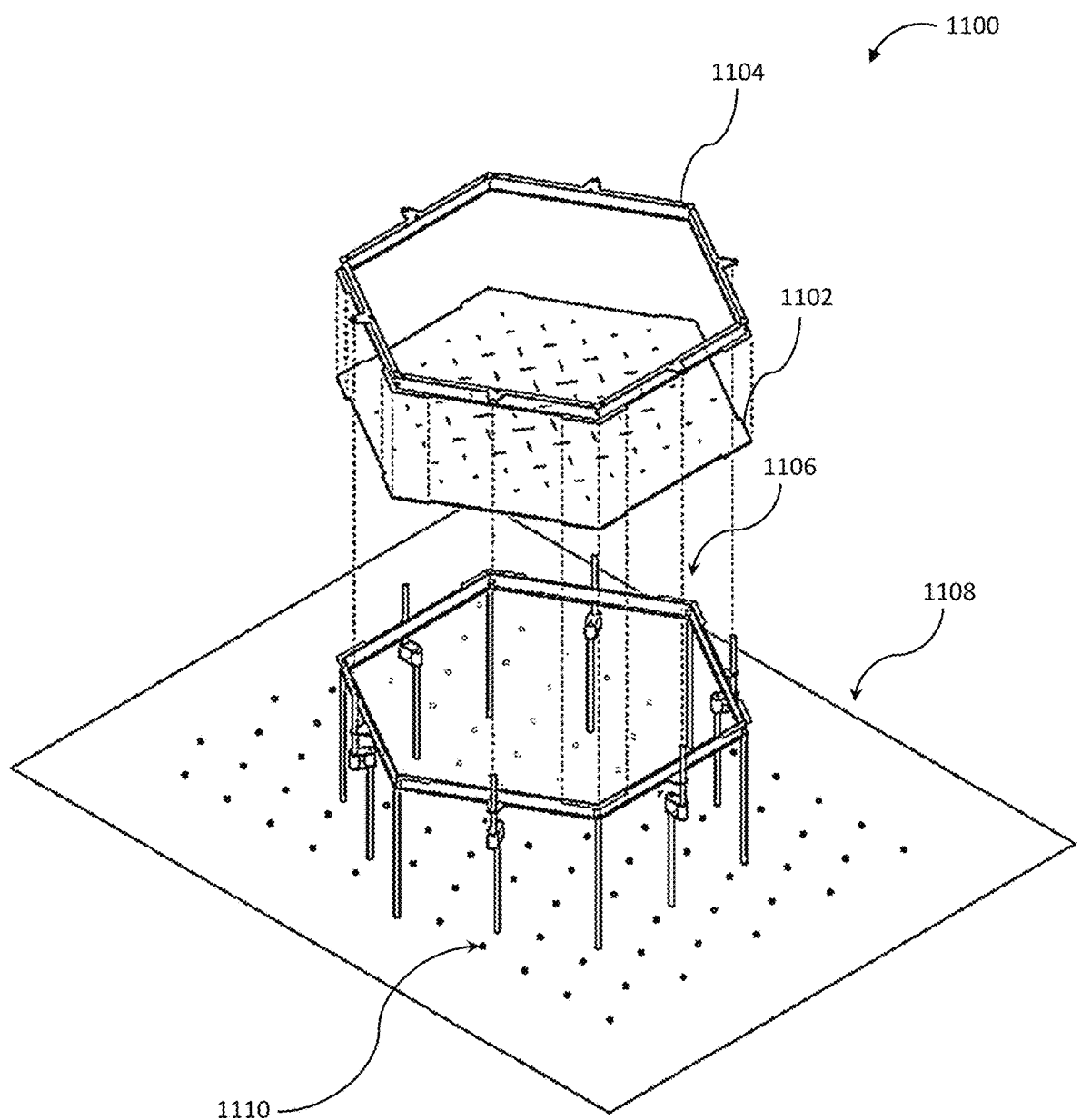
FIG. 11 is a view of a support frame for use in the fabrication method of FIG. 1 in accordance with one example.

FIG. 11 depicts a support frame 1100 for heating a panel 1102 in accordance with one example. The support frame 1100 may be configured to provide sufficient space for the glass to sag during heating. In this example, the support frame 1100 includes an upper rim 1104 and a lower rim 1106 that engage opposite sides of the panel. The rims 1104, 1106 are configured to engage the panel 1102 along an outer edge thereof. The lower rim 1106 is supported by a plurality of legs of the support frame 1100. In this example, each leg has an integrated clamp to secure the upper and lower rims 1104, 1106 in place. Spring mechanisms may be incorporated into the clamps to provide a desired clamping force to the glass. The configuration, construction, and other characteristics of the support frame 1100 may vary.

The characteristics of the kiln in which the support frame 110 is disposed may also vary. For instance, various types of heat sources may be used.

Figure 12:
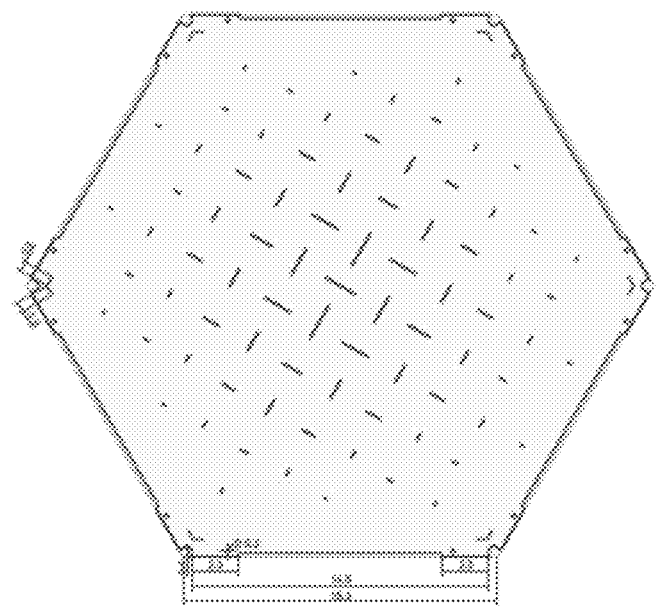
FIG. 12 is a schematic view of a flat panel having features configured for engagement by a support frame in accordance with one example.

The temperature sequence may be used to control the extent of slumping or sagging. For instance, increasing the duration of time the glass is at its slumping temperature (i.e., the soak time) results in an increased amount of sag or curvature. The temperature sequence for heating the panels may vary. One example temperatures sequence is set forth below, with the understanding that other temperature levels and time periods may be used.
 1. from room temperature, ramp up to 964 F/518 C over 360 minutes
 2. ramp up to 1076 F/580 C over 15 minutes
 3. hold at 1076 F/580 C 30 minutes
 4. ramp down to 964 F/518 C over 15 minutes
 5. ramp down to 914 F/490 C over 5 minutes
 6. hold at 914 F/490 C 45 minutes
 7. ramp down to 764 F/406 C over 30 minutes
 8. ramp down to 84 F/29 C over 60 minutes FIG. 12 depicts a flat panel having an edge configured to facilitate engagement by a support frame, such as the support frame 1100 of FIG. 11. In this case, the flat panel includes relief cuts in the corners of the flat panel. The relief cuts may be sized (e.g., sufficiently short or small) such that no acoustic effect is provided thereby. The relief cuts may be configured to accept or otherwise accommodate hardware connectors. Further details regarding an example of the hardware connectors are provided below.

Figure 13:
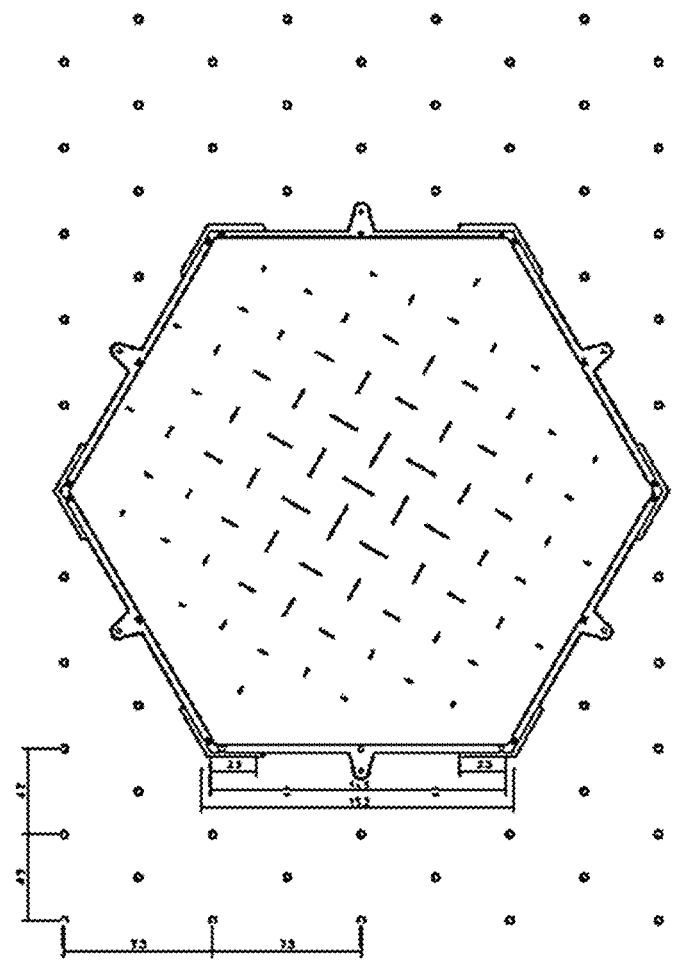
FIG. 13 is a schematic view of a flat panel in connection with support rods used in the fabrication method of FIG. 1 in accordance with one example.

FIG. 13 depicts an example arrangement of temporary support rods for a panel disposed in the support frame. The number, spacing (density), cross-section, and other characteristics of the temporary support rods may vary. The extent to which the support rods are used may also vary. Rods outside of the support frame are depicted for ease in illustration of the spacing and arrangement of the rods.

Figure 14:
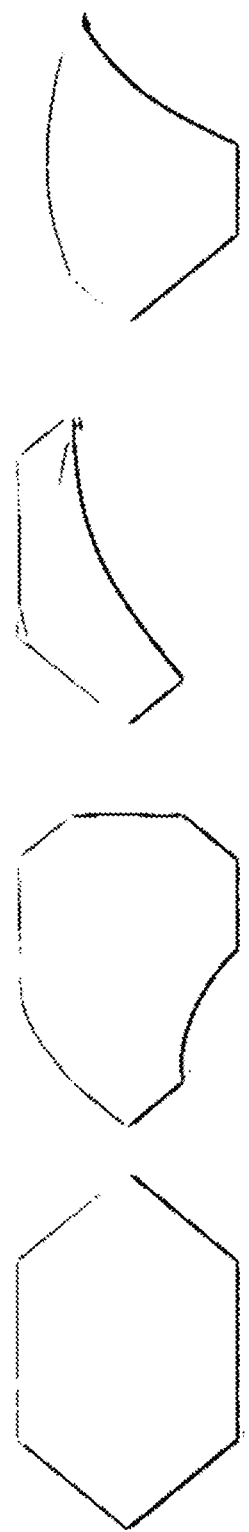
FIG. 14 depicts perspective views of a number of acoustic devices having various perimeter shapes in accordance with several examples.

FIG. 14 depicts different acoustic panes with edge condition variations according to several examples. These examples depict how the perimeter or shape of the acoustic devices may vary. Differently shaped devices may be included in an acoustic system to more completely cover a wall or other surface.

Figure 15:
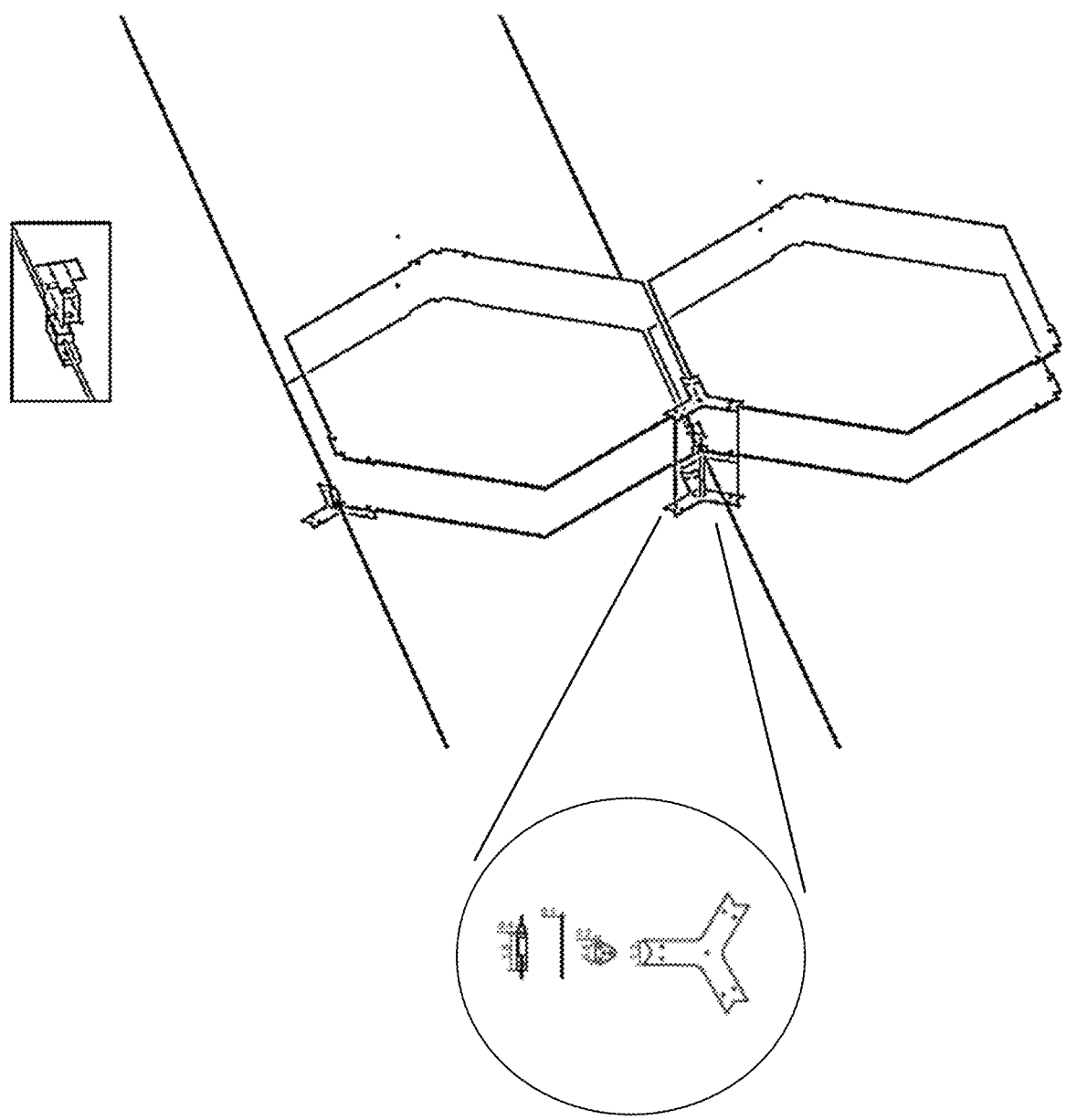
FIG. 15 is a schematic view of a suspension system of an acoustic system in accordance with one example.

FIG. 15 depicts a suspension system of the disclosed acoustic systems according to one example. The suspension system may include support wires and attachment hardware to assemble the acoustic panes. The hardware components may include various types of clips or other attachment mechanisms. In this example, the attachment hardware includes an adjustable cable gripper, one or more metal plates, and various fastener arrangements (e.g., washers, nuts and bolts). In some cases, the metal plates are placed on the surface of the glass plate and aligned to pre-cut holes and areas of the glass that have been pressed flat in the support frame. Rubber washers hold the metal plates off of the glass to protect the glass from direct contact with the metal. The fasteners secure (e.g., sandwich) the metal plates around the glass. The cable gripper slides along and grips to the tension wire.

The relief cuts along the edges of the panels (e.g., as shown in FIG. 12) may be configured to provide stress relief for the slumps at locations where the movement of the glass while slumping might build up stress due to, for instance, the geometry of the shape or more material being held or pinched by the frame. In such cases, the material may be held at a corner because of the location of the suspension hardware. More material may be left in the locations at or near the hardware to allow for a larger surface area for the metal plate in the hardware and to provide sufficient spacing from the edge of the glass for fasteners, e.g., the bolts. With too little spacing from the edge of the glass, the glass may be fragile where the holes are cut for the bolts. Depending on the geometry of the perimeter, additional or alternative relief cuts may be useful elsewhere to, e.g., otherwise prevent cracking, at tight corners for example, whether or not there is hardware placed there.

Figure 16:
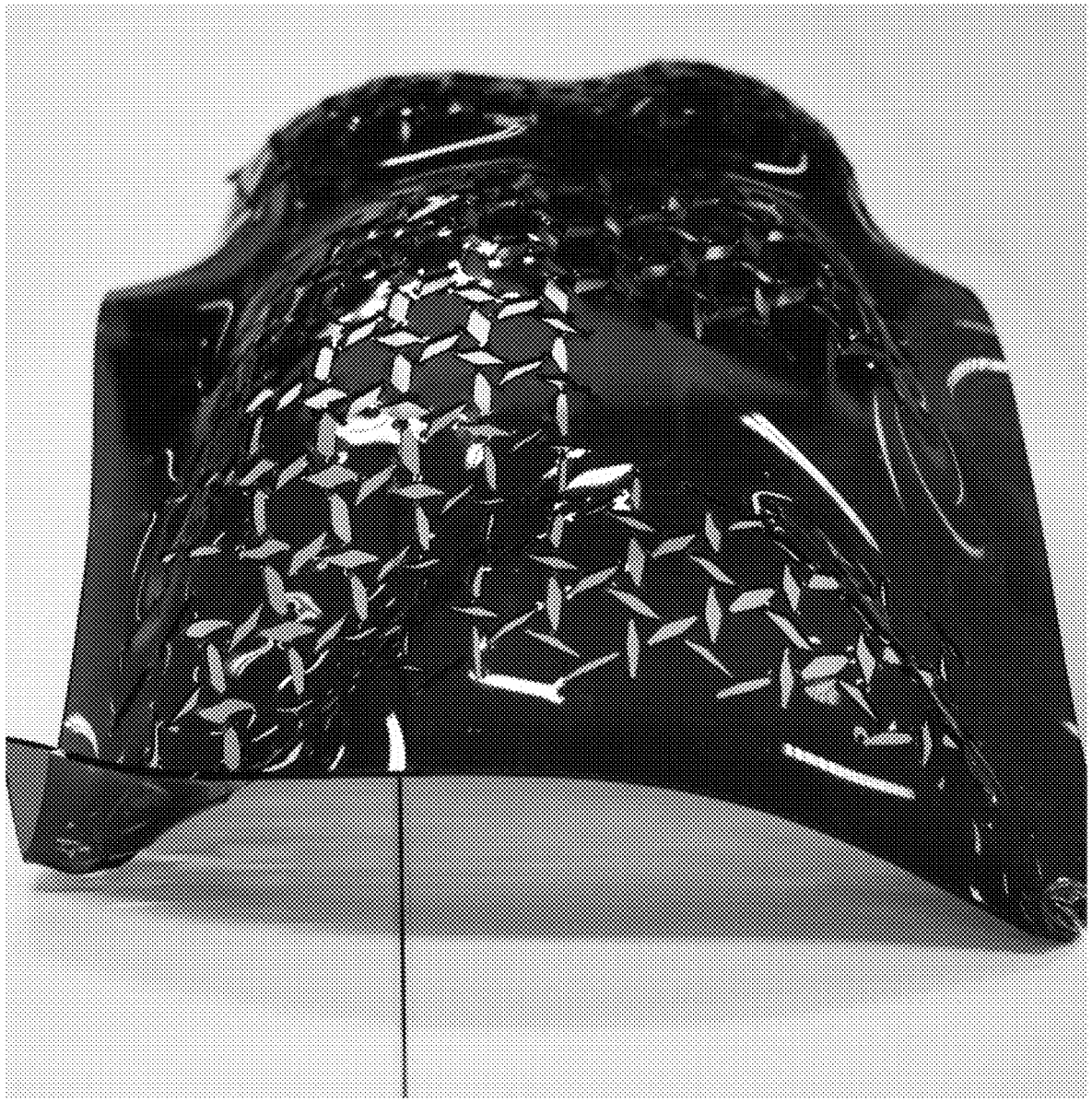
FIG. 16 is a perspective view of a curved pane having auxetic features in accordance with one example.

FIG. 16 depicts a panel exhibiting auxetic curvature according to one example. The auxetic curvature is enabled via the cuts formed in the panel. During the slumping, the panel near the cuts unwinds, or twists, in an auxetic manner. Where the cuts are located, the material sags more freely than in regions without cuts, as the glass stretches under its own weight. The ease of movement ends abruptly at the perimeter of the panel, and inflection points are introduced. The panel may thus include double curvatures, such as saddle surfaces.

Figure 17:
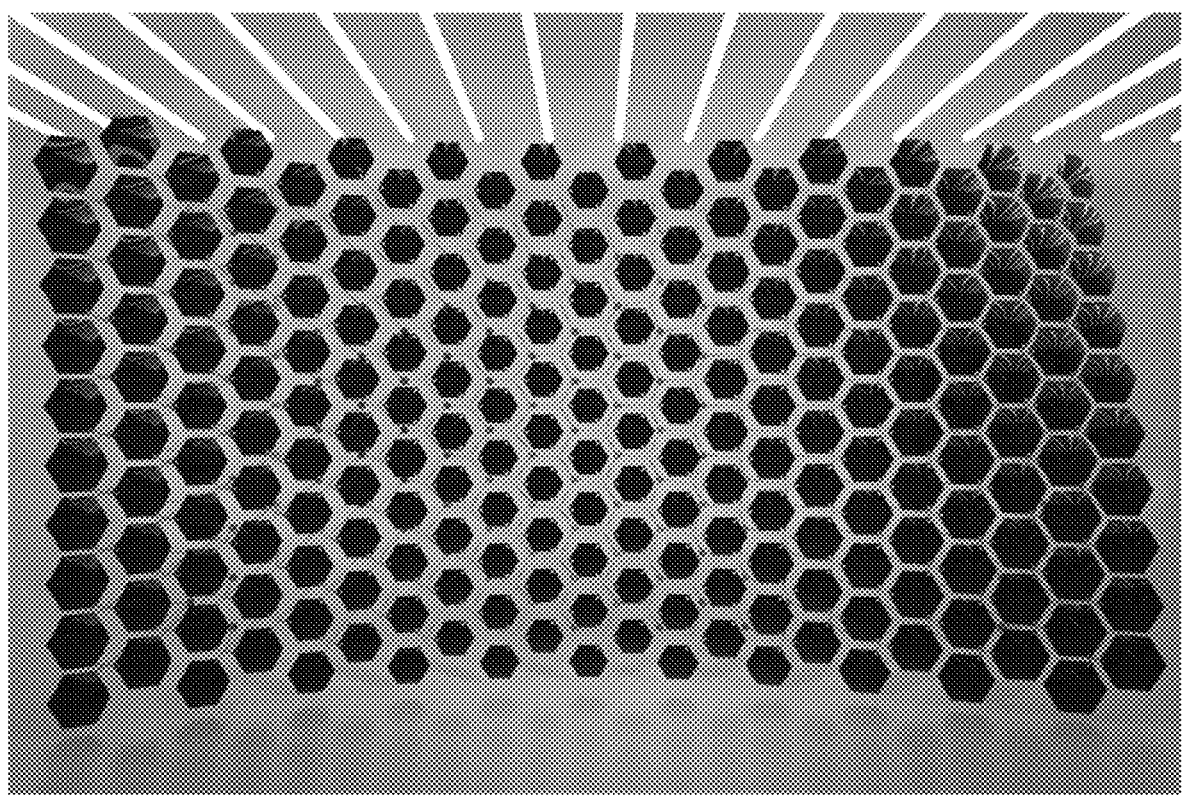
FIG. 17 is an elevational view of an acoustic system having an arrangement of panes in accordance with one example.
Figure 18:
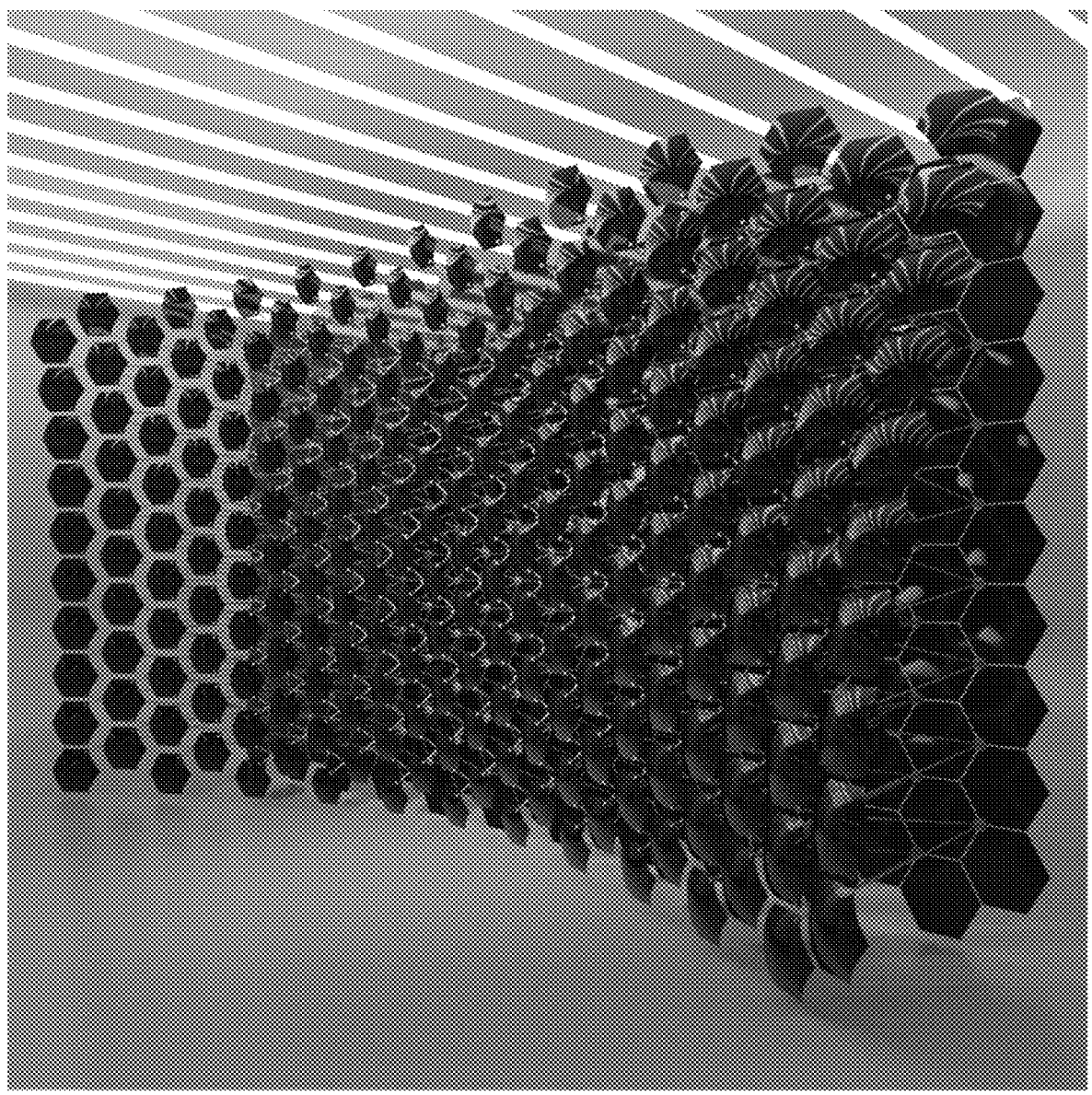
FIG. 18 is a perspective view of an acoustic system having a multi-layer arrangement of panes in accordance with one example.

FIGS. 17 and 18 depict examples of acoustic systems including an array of panes. The example of FIG. 17 is a single layer array. The example of FIG. 18 is a two-layer array. Any number of layers may be assembled. In each case, the acoustic system also includes a suspension system that engages and supports the panes. The panes may thus be aggregated along a wall or other surface. The panes may be similarly or variably configured as described herein. In other cases, the panes may stand alone rather than be mounted on a wall or other surface.

Figure 19:
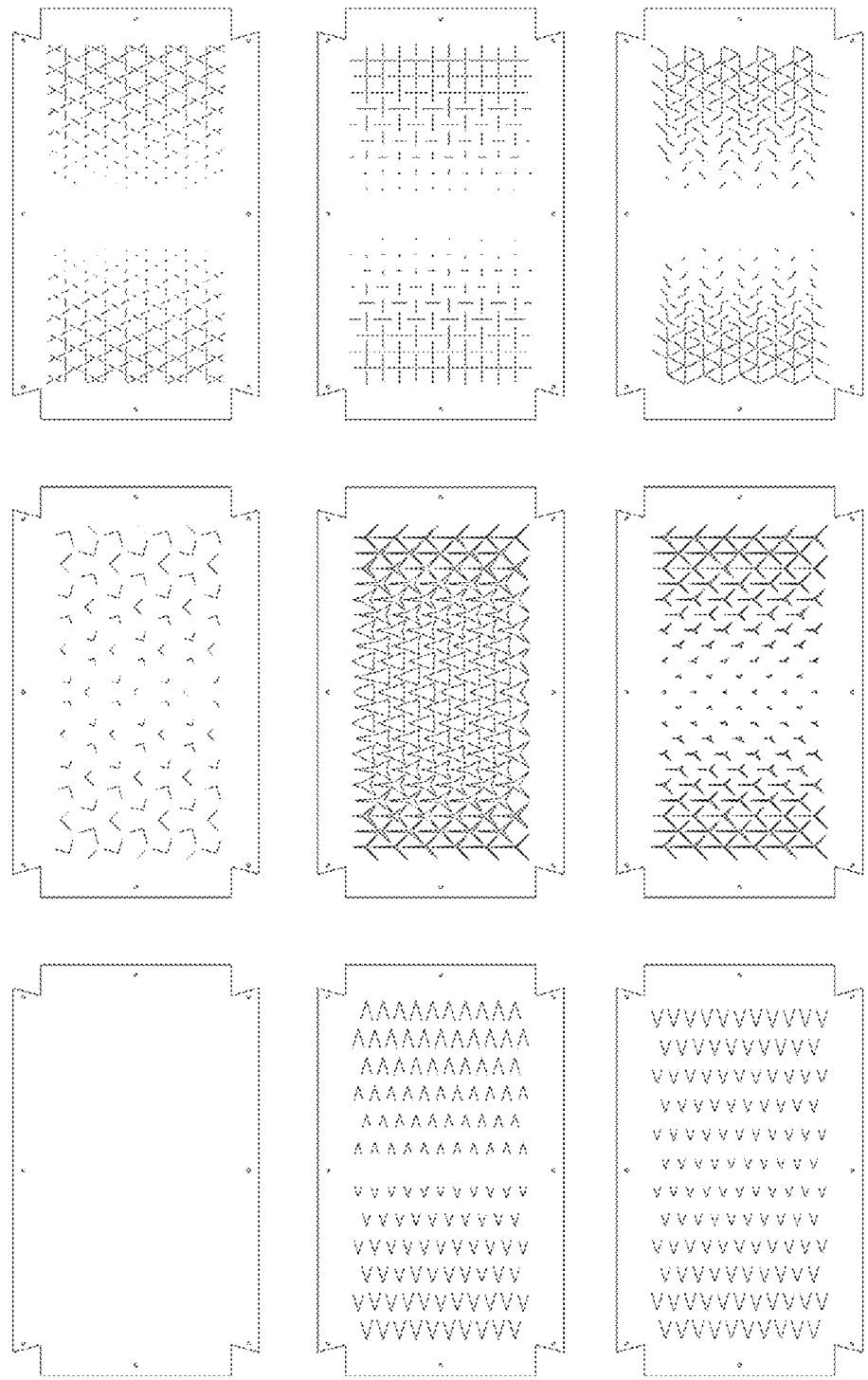
FIG. 19 depicts schematic views of a number of flat panels having various cut patterns prior to thermoforming in accordance with several examples.

FIG. 19 depicts a number of examples of cut patterns. The examples show how, in some case, the cuts in a respective panel may have different shapes.

Figure 20:
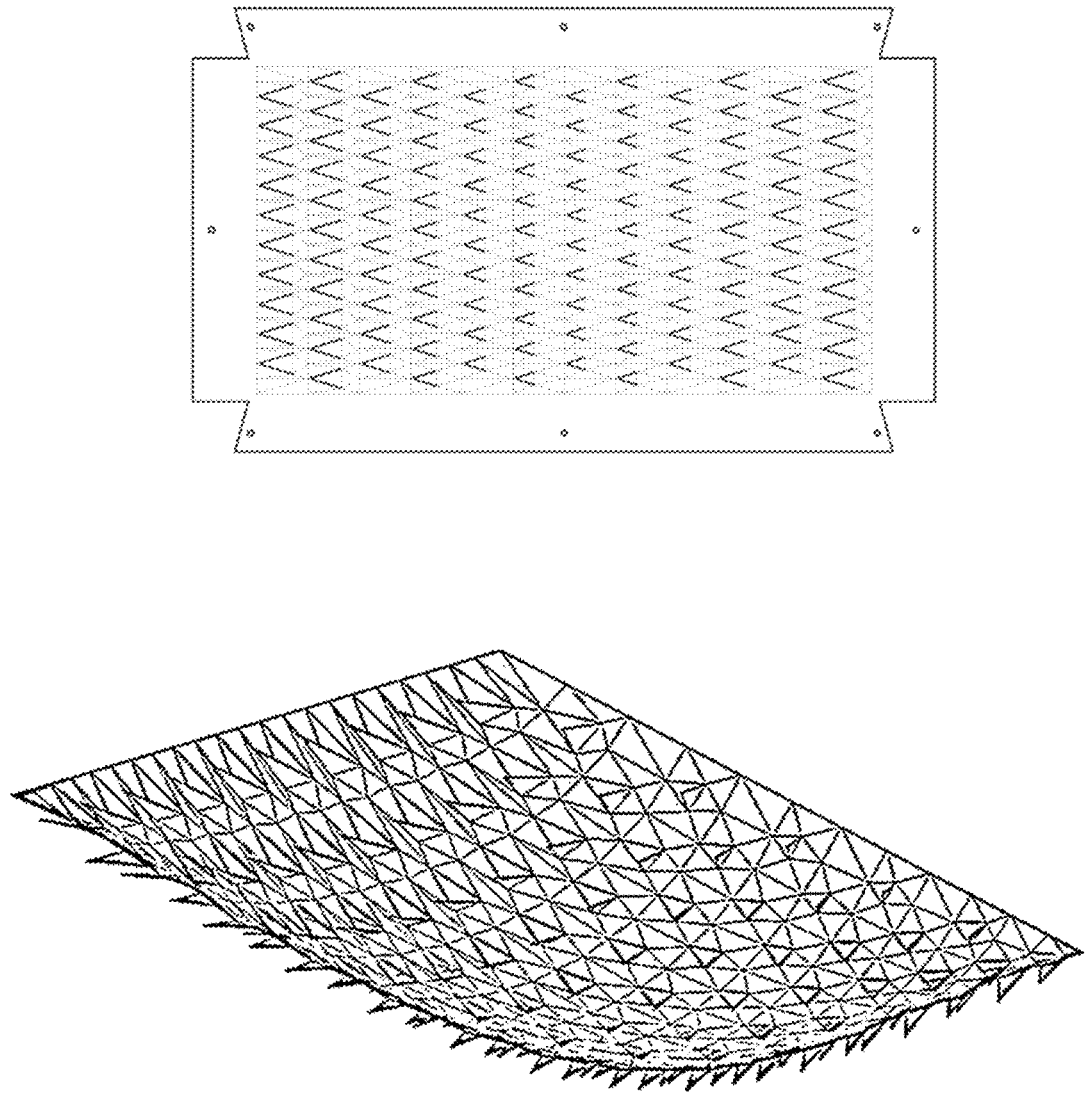
FIG. 20 depicts schematic and perspective views of an acoustic device having a uniform cut pattern before thermoforming and non-auxetic features after thermoforming in accordance with one example.

FIG. 20 shows an example of an acoustic pane having non-auxetic deformation. In this example, the acoustic pane includes V-shaped cuts that lead to triangular flaps as a result of sagging. The flaps may provide a directionality to the set of openings.

Figure 21:
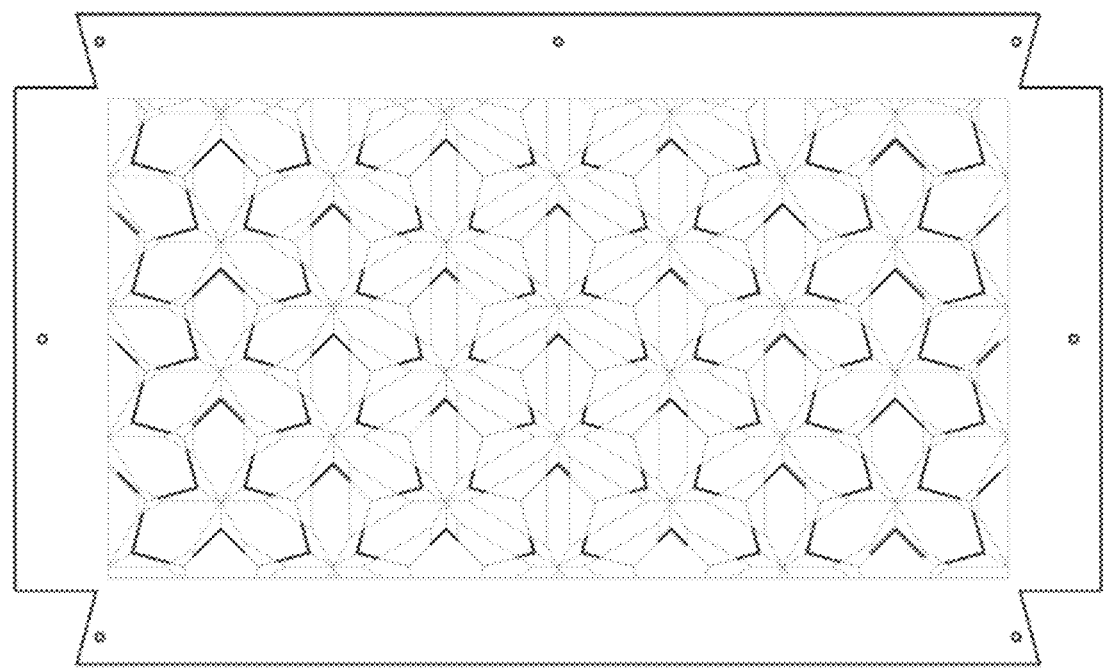
FIG. 21 is schematic view of a flat panel having a cut pattern in accordance with one example.

FIG. 21 shows an example of a panel having cuts arranged in a triad pattern. In this case, each cut is V-shaped. Unlike the examples above, the triad pattern orients the V-shaped cuts in different directions. A variety of other orientations and patterns may be used.

Figure 22:
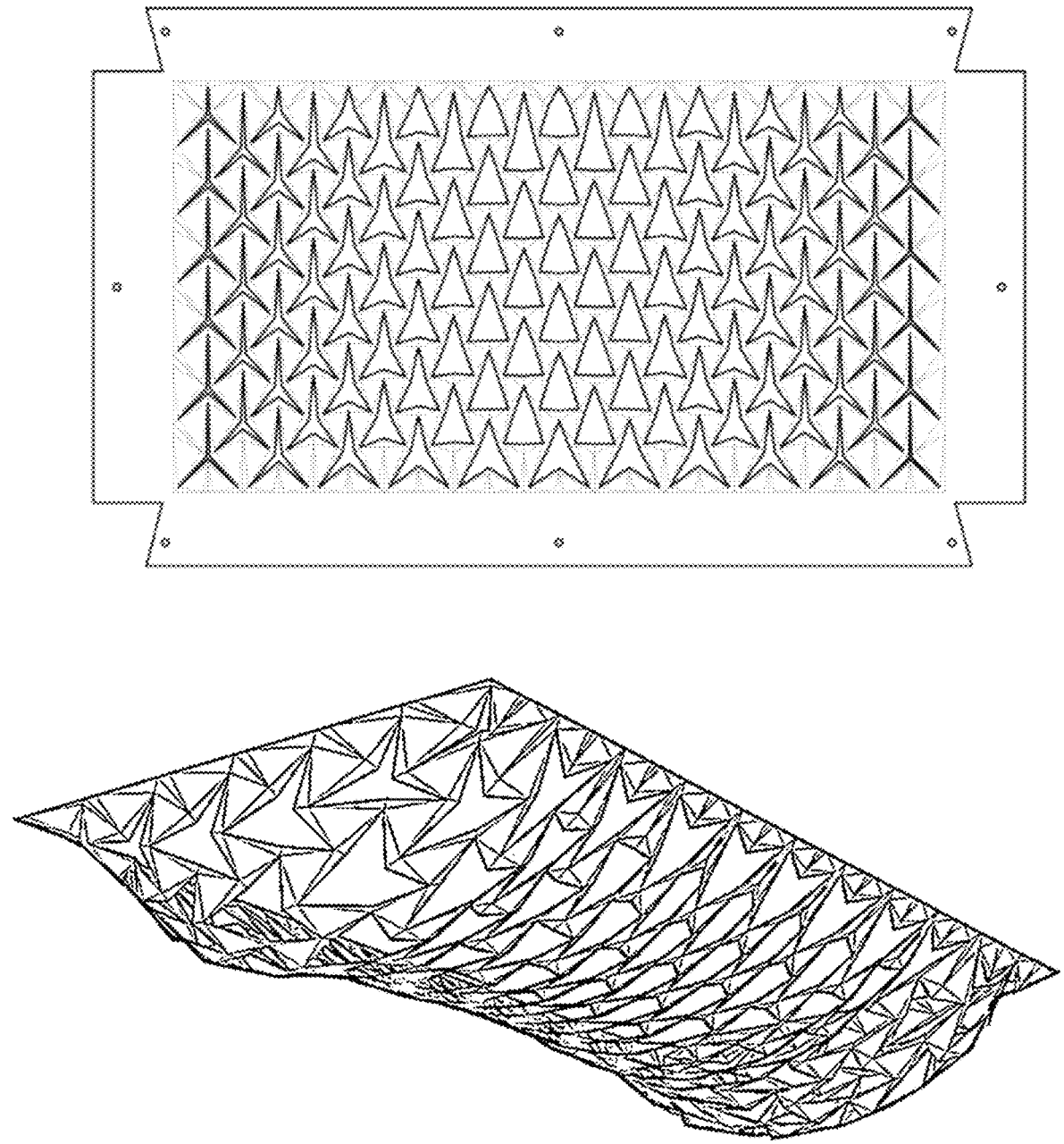
FIG. 22 depicts schematic and perspective views of an acoustic device having a variable cut pattern before thermoforming and auxetic features after thermoforming in accordance with one example.

FIG. 22 depicts an example of a panel having holes of varying shapes. In this example, the holes range from slits (e.g., a line cut) to holes (e.g., cuts that remove a shape). In some cases, a Resch pattern is provided. The Resch pattern includes Y-shaped cuts that form triangular faces that rotate when the pane sags. The Y-shaped cuts may create flaps shaped as triangles or hexagons. The variable hole pattern may lead to variable amounts of auxetic behavior, e.g., from fully auxetic to non-auxetic.

FIG. 23 depicts an example of an acoustic system having a number of surfaces covered with panes. In some cases, the acoustic system may be used to cover a number of the surfaces of a room. The aggregation of the panes described herein allows a variety of different surfaces to be covered by the disclosed acoustic devices.

Figure 25:
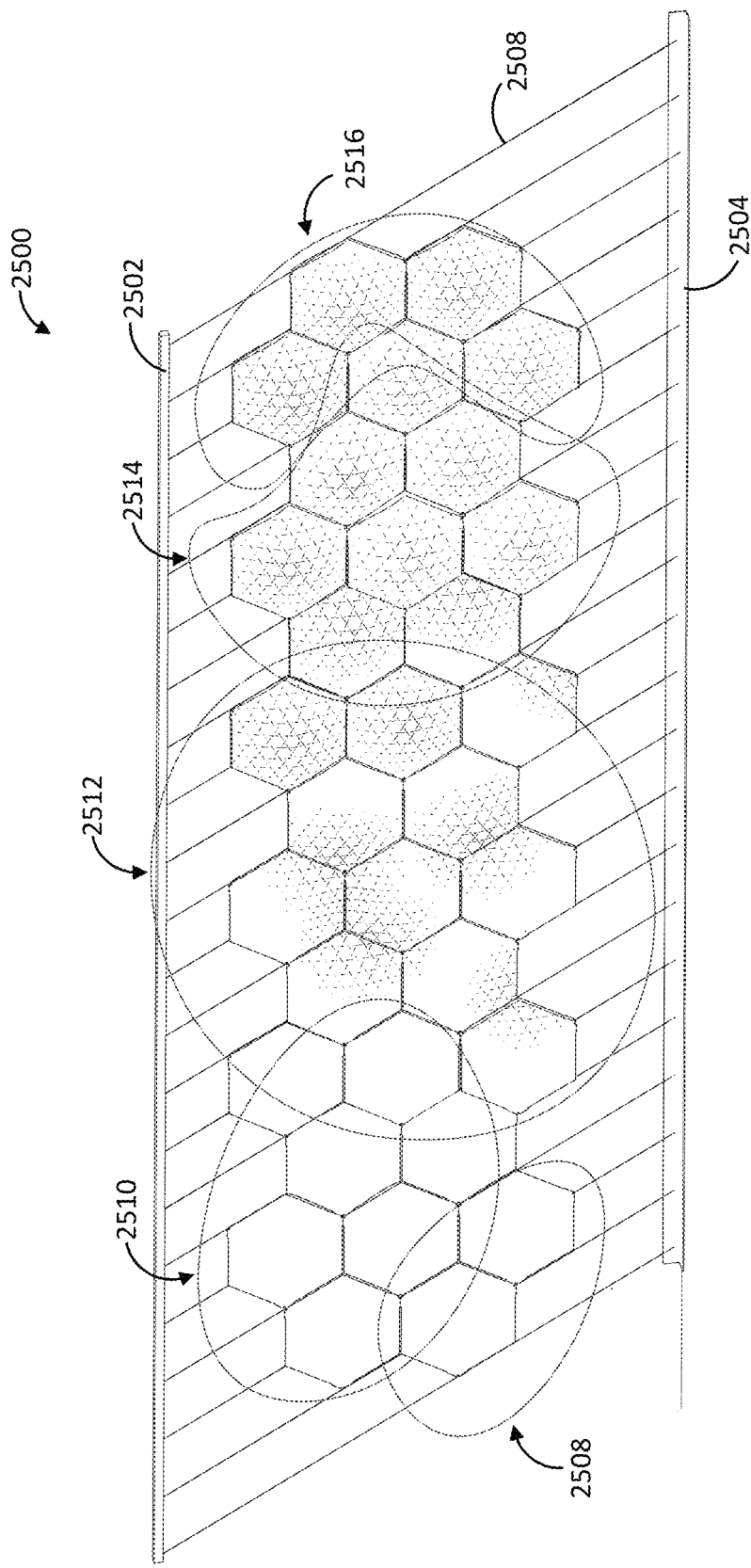
FIG. 25 is a schematic view of an acoustic system having a plurality of panes arranged and otherwise configured to provide multiple acoustic functions in accordance with one example.

FIG. 25 depicts an example of an acoustic system 2500 having multiple regions or portions configured to implement different acoustic functions. In this example, the acoustic system 2500 is suspended between upper and lower mounting objects 2502, 2504 via a set of guide wires 2506. The acoustic system 2500 may be disposed along a wall of a room and/or in front of a backer or other substrate. In other cases, the acoustic system 2500 is not disposed in a suspended configuration.

Each zone or region of the acoustic system 2500 includes a set of panes. The cut patterns of the panes vary to establish the acoustic function of the zone. For instance, the panes within each zone may have different cut patterns. As described herein, in some cases, the cut pattern varies across an individual pane.

In the example of FIG. 25, the panes are arranged and otherwise configured such that the acoustic system 2500 includes a reflective zone 2508, a focusing zone 2510, a diffusive zone 2512, an absorptive zone 2514, and a transparent zone 2516. Adjacent zones may or may not overlap as shown. Some portions of the acoustic system 2500 may present a mixture or combination of acoustic functions (e.g., diffusive and absorptive). Fewer, additional, or alternative zones may be provided. The arrangement, size, shape, acoustic function, and other characteristics of the zones may vary from the example shown.

Figure 26:
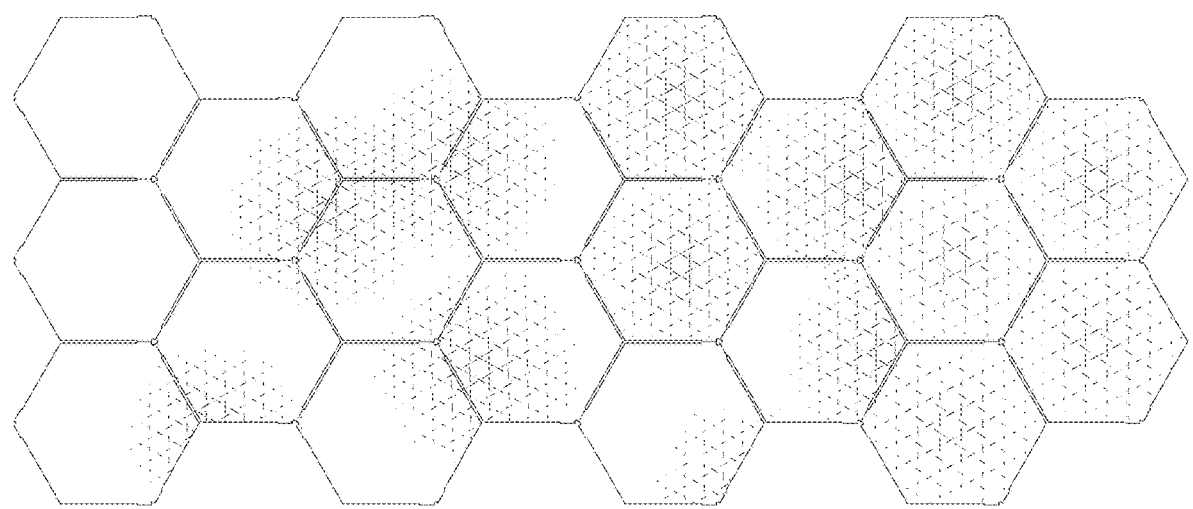
FIG. 26 is a schematic view of an acoustic system having a plurality of panes in which perforation patterns are shared by, or extend across, adjacent panes in accordance with one example.

FIG. 26 is a schematic view of an acoustic system having a plurality of panes in accordance with another example. In this case, perforation patterns are shared by adjacent panes of the plurality of panes. As shown in the example of FIG. 26, the perforation patterns, extend across the boundary between the adjacent panes. As a result, multiple panes may contribute to the implementation of a respective acoustic function provided by the acoustic system.

The functionality of any of the examples described herein may be frequency dependent. For instance, one or more zones of an acoustic system may provide one acoustic function in a first frequency range, and another acoustic function in a second frequency range. The disclosed devices and systems may thus be configured to provide one or more acoustic responses that vary(ies) as a function of frequency.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A method of fabricating an acoustic device, the method comprising:
   forming a plurality of holes in a panel;
   disposing the panel in a support frame; and
   heating the panel without a mold to a temperature such that the panel sags while disposed in the support frame and each hole of the plurality of holes is modified.

2. The method of claim 1, wherein forming the plurality of holes comprises cutting a plurality of elongated slots in the panel.

3. The method of claim 1, wherein the plurality of holes comprise at least one hole shaped such that the at least one hole exhibits auxetic deformation when the panel sags.

4. The method of claim 1, wherein forming the plurality of holes comprises implementing a waterjet cutting procedure.

5. The method of claim 1, wherein the panel comprises a glass material.

6. The method of claim 5, wherein the glass material comprises float glass.

7. The method of claim 1, further comprising defining a perimeter shape of the panel before disposing the panel in the support frame.

8. The method of claim 1, further comprising supporting the panel with a plurality of rods as the panel is initially heated.

9. A method of fabricating an acoustic pane, the method comprising:
   cutting a plurality of elongated slots in a flat panel;
   disposing the flat panel in a frame; and
   heating the flat panel without a mold in a kiln to a temperature such that the flat panel sags while disposed in the frame and each elongated slot of the plurality of elongated slots undergoes deformation.

10. The method of claim 9, wherein the deformation is auxetic.

11. An acoustic device comprising:
   a panel having a perimeter and an interior face within the perimeter, the interior face having a sagging curvature; and
   a plurality of holes in the interior face;
   wherein the sagging curvature of the interior face is modified by either auxetic deformation or a flap at one or more holes of the plurality of holes.

12. The acoustic device of claim 11, wherein the curvature is non-uniform.

13. The acoustic device of claim 11, wherein each hole of the one or more holes is configured such that the interior face comprises a flap at each hole, each flap projecting outward from the curvature of the interior face.

14. The acoustic device of claim 11, wherein the panel has an inflection between the perimeter and the curvature of the interior face.

15. The acoustic device of claim 14, wherein:
the perimeter is disposed in a plane; and
the curvature projects outward from the plane.

16. The acoustic device of claim 11, wherein the plurality of holes are arranged in a variable hole pattern such that the panel has auxetic deformation at a first hole of the plurality of holes and non-auxetic deformation at a second hole of the plurality of holes.

17. The acoustic device of claim 11, wherein:
each hole of the plurality of holes is elongated; and
a respective length of each hole of the plurality of holes varies across the panel.

18. The acoustic device of claim 11, wherein:
the plurality of holes comprise a first hole and a second hole; and
the first hole is oriented at an angle relative to the second hole.

19. The acoustic device of claim 11, wherein the panel comprises a glass material.

20. An acoustic system comprising:
a framework; and
a plurality of panes supported by the framework;
wherein:
each pane comprises a face with a sagging curvature and further comprises a plurality of holes in the face;
the sagging curvature, the plurality of holes, or both the curvature and the plurality of holes differ across the plurality of panes; and
in at least one of the panes of the plurality of panes, the sagging curvature of the face is modified by either auxetic deformation or a flap at one or more holes of the plurality of holes.

21. The acoustic system of claim 20, wherein, in at least one pane of the plurality of panes, the face is twisted beyond the curvature at one or more holes of the plurality of holes.

22. The acoustic system of claim 20, wherein the plurality of panes are disposed in multiple layers.

23. The acoustic system of claim 20, wherein the plurality of panes comprises first and second panes arranged back-to-back.

24. The acoustic system of claim 20, wherein the framework is configured to suspend the plurality of panes from a set of wires.

25. The acoustic system of claim 20, wherein the framework comprises a flat surface to which the plurality of panes are mounted.

26. The acoustic system of claim 20, wherein the framework is configured such that the plurality of panes are disposed in a standalone arrangement.

27. The acoustic system of claim 20, wherein:
each pane of the plurality of panes comprises a glass material; and
the plurality of panes are arranged and configured to provide multiple acoustic functions.

28. The acoustic system of claim 27, wherein the multiple acoustic functions comprise absorption.

29. The acoustic system of claim 28, wherein the multiple acoustic functions further comprise diffusion.

30. The acoustic system of claim 27, wherein the plurality of panes are arranged in multiple layers.

31. The acoustic system of claim 30, wherein the plurality of panes in the multiple layers are arranged and configured such that the multiple acoustic functions comprise absorption.

32. The acoustic system of claim 30, wherein panes of the plurality of panes in adjacent layers of the multiple layers are offset from one another.

33. The acoustic system of claim 30, wherein:
first and second panes of the plurality of panes are disposed in adjacent layers of the multiple layers in a back-to-back arrangement; and
the holes in the first and second panes are not aligned with one another.

34. The acoustic system of claim 30, wherein:
first and second panes of the plurality of panes are disposed in adjacent layers of the multiple layers in a back-to-back arrangement; and
the holes in the first and second panes are aligned with one another.

35. The acoustic system of claim 20, wherein:
the holes in the faces of the plurality of panes are distributed to establish multiple zones of the acoustic system; and
the multiple zones implement different acoustic functions.

36. The acoustic system of claim 35, wherein the multiple zones comprise an absorptive zone, a transparent zone, and a diffusive zone.

37. The acoustic system of claim 20, wherein:
the holes in the faces of the plurality of panes are distributed to establish multiple portions of the acoustic system; and
a respective portion of the multiple portions exhibits a mixture of multiple acoustic functions.

38. The acoustic system of claim 20, further comprising a further pane supported by the framework, wherein a face of the further pane lacks a hole.

39. The acoustic system of claim 20, wherein, in at least a further one of the panes of the plurality of panes, one or more of the holes is elongated.

* * * * *